(12) United States Patent
Webber et al.

(10) Patent No.: US 7,543,848 B2
(45) Date of Patent: Jun. 9, 2009

(54) APPARATUS AND METHOD FOR CONTROLLING AN INFLATABLE CUSHION

(75) Inventors: James L. Webber, Shelby Township, MI (US); Mark T. Winters, Troy, OH (US); Laura A. Hawthorn, Tipp City, OH (US); Ryan T. Pinsenschaum, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 383 days.

(21) Appl. No.: 11/266,539

(22) Filed: Nov. 3, 2005

(65) Prior Publication Data

US 2006/0061076 A1    Mar. 23, 2006

Related U.S. Application Data

(63) Continuation-in-part of application No. 10/905,959, filed on Jan. 27, 2005, and a continuation-in-part of application No. 10/802,394, filed on Mar. 17, 2004, now Pat. No. 7,188,862, and a continuation-in-part of application No. 10/078,961, filed on Feb. 20, 2002, now Pat. No. 6,991,258.

(60) Provisional application No. 60/640,377, filed on Dec. 30, 2004, provisional application No. 60/541,793, filed on Feb. 4, 2004.

(51) Int. Cl.
   *B60R 21/015*    (2006.01)
   *B60R 21/276*    (2006.01)
(52) U.S. Cl. .................. 280/735; 280/739; 280/743.2
(58) Field of Classification Search ............... 280/735, 280/736, 739, 742, 743.1, 743.2; 701/45
See application file for complete search history.

(56) References Cited

U.S. PATENT DOCUMENTS 5,118,134 A * 6/1992 Mattes et al. ............... 280/735

(Continued)

FOREIGN PATENT DOCUMENTS

DE    3618060 A1    12/1987

(Continued)

OTHER PUBLICATIONS

EP search report dated Apr. 13, 2006.

*Primary Examiner*—Faye M. Fleming
*Assistant Examiner*—Laura Freedman
(74) *Attorney, Agent, or Firm*—Douglas D. Fekete

(57) ABSTRACT

A system for controlling an inflation output in an inflatable cushion of an air bag module, comprising: a first sensing device, the first sensing device being an electronic sensing device configured to detect the presence of an object proximate to the air bag module, when the inflatable cushion is in an un-inflated state, the first sensing device providing a suppression signal when an object is detected within an area proximate to the air bag module; a second sensing device, the second sensing device being a mechanical sensing device configured to detect whether a leading edge of the inflatable cushion has made contact with an object prior to the leading edge reaching a predetermined distance from the air bag module during inflation of the inflatable cushion, the second sensing device being disposed within the inflatable cushion and is configured to cause the inflation output provided to the inflatable cushion to be varied when the leading edge of the inflatable cushion has made contact with an object prior to the leading edge reaching the predetermined distance from the air bag module; and a sensing and diagnostic module for receiving the suppression signal and an activation signal, wherein the activation signal corresponds to an event that requires inflation of inflatable cushion in absence of the suppression signal and the sensing and diagnostic module is configured to determine whether the inflation output is to be provided to the inflatable cushion.

9 Claims, 19 Drawing Sheets

U.S. PATENT DOCUMENTS

| | | | | |
|---|---|---|---|---|
| 5,246,250 A | * | 9/1993 | Wolanin et al. | 280/739 |
| 5,308,113 A | * | 5/1994 | Moriset | 280/743.2 |
| 5,330,226 A | * | 7/1994 | Gentry et al. | 280/735 |
| 5,366,242 A | * | 11/1994 | Faigle et al. | 280/736 |
| 5,405,166 A | * | 4/1995 | Rogerson | 280/739 |
| 5,413,378 A | * | 5/1995 | Steffens et al. | 280/735 |
| 5,439,249 A | * | 8/1995 | Steffens et al. | 280/735 |
| 5,489,119 A | | 2/1996 | Prescaro et al. | 280/743.2 |
| 5,722,686 A | * | 3/1998 | Blackburn et al. | 280/735 |
| 5,746,447 A | | 5/1998 | Dyer et al. | 280/743.2 |
| 5,762,367 A | | 6/1998 | Wolanin | 280/736 |
| 5,770,997 A | * | 6/1998 | Kleinberg et al. | 340/438 |
| 5,799,974 A | | 9/1998 | Honda | 280/739 |
| 5,802,479 A | | 9/1998 | Kithil et al. | |
| 5,813,696 A | * | 9/1998 | Hill | 280/743.2 |
| 5,887,894 A | | 3/1999 | Castagner et al. | 280/743.2 |
| 5,957,490 A | | 9/1999 | Sinnhuber | 280/735 |
| 5,964,478 A | * | 10/1999 | Stanley et al. | 280/735 |
| 5,997,033 A | * | 12/1999 | Gray et al. | 280/739 |
| 5,997,037 A | * | 12/1999 | Hill et al. | 280/743.2 |
| 6,053,530 A | * | 4/2000 | Faigle | 280/735 |
| 6,076,854 A | * | 6/2000 | Schenck et al. | 280/743.2 |
| 6,095,557 A | * | 8/2000 | Takimoto et al. | 280/739 |
| 6,116,644 A | | 9/2000 | Viano et al. | 280/743.1 |
| 6,161,866 A | | 12/2000 | Ryan et al. | 280/736 |
| 6,168,191 B1 | | 1/2001 | Webber et al. | 280/730.2 |
| 6,170,871 B1 | | 1/2001 | Goestenkors et al. | 280/743.1 |
| 6,186,540 B1 | | 2/2001 | Edgren | 280/735 |
| 6,189,928 B1 | | 2/2001 | Sommer et al. | |
| 6,196,575 B1 | | 3/2001 | Ellerbrok et al. | |
| 6,203,061 B1 | | 3/2001 | Niederman et al. | 280/736 |
| 6,213,502 B1 | | 4/2001 | Ryan et al. | 280/736 |
| 6,220,627 B1 | * | 4/2001 | Stanley | 280/735 |
| 6,247,726 B1 | | 6/2001 | Ryan | 280/739 |
| 6,250,677 B1 | | 6/2001 | Fujimura | 280/743.2 |
| 6,286,859 B2 | | 9/2001 | Derrick et al. | 280/728.2 |
| 6,308,983 B1 | | 10/2001 | Sinnhuber | 280/735 |
| 6,315,323 B1 | * | 11/2001 | Pack, Jr. | 280/743.2 |
| 6,334,627 B1 | | 1/2002 | Heym et al. | 280/743.2 |
| 6,371,517 B1 | | 4/2002 | Webber et al. | 280/736 |
| 6,390,501 B1 | | 5/2002 | Greib et al. | 280/743.2 |
| 6,409,209 B2 | | 6/2002 | Amamori et al. | 280/728.2 |
| 6,409,213 B2 | | 6/2002 | Webber et al. | 280/739 |
| 6,419,267 B1 | | 7/2002 | Hashimoto et al. | 280/743.1 |
| 6,422,593 B1 | | 7/2002 | Ryan | |
| 6,422,597 B1 | | 7/2002 | Pinsenschaum et al. | 280/735 |
| 6,425,603 B1 | | 7/2002 | Eschbach | 280/743.2 |
| 6,431,583 B1 | | 8/2002 | Schneider | 280/728.2 |
| 6,431,596 B1 | | 8/2002 | Ryan et al. | 280/739 |
| 6,439,603 B2 | | 8/2002 | Damman et al. | 280/736 |
| 6,454,300 B1 | | 9/2002 | Dunkle et al. | 280/742 |
| 6,499,765 B2 | | 12/2002 | Hawthorn et al. | 280/743.1 |
| 6,511,094 B2 | | 1/2003 | Thomas et al. | 280/743.2 |
| 6,561,545 B2 | | 5/2003 | Greib et al. | 280/743.2 |
| 6,592,146 B2 | | 7/2003 | Pinsenschaum et al. | 280/743.2 |
| 6,616,184 B2 | | 9/2003 | Fischer | 280/743.2 |
| 6,634,671 B2 | | 10/2003 | Heigl et al. | 280/743.2 |
| 2001/0038201 A1 | * | 11/2001 | Ryan | 280/742 |
| 2002/0020990 A1 | * | 2/2002 | Sinnhuber et al. | 280/729 |
| 2002/0117840 A1 | | 8/2002 | Dunkle et al. | |
| 2002/0158456 A1 | | 10/2002 | Fischer | |
| 2003/0155756 A1 | | 8/2003 | Hawthorn et al. | 280/739 |
| 2004/0012179 A1 | | 1/2004 | Pinsenschaum et al. | 280/739 |
| 2004/0012180 A1 | | 1/2004 | Hawthorn et al. | 280/739 |
| 2004/0051285 A1 | | 3/2004 | Fischer | 280/739 |
| 2004/0094941 A1 | | 5/2004 | Waid et al. | 280/736 |
| 2004/0104564 A1 | | 6/2004 | Hawthorn et al. | |
| 2004/0232677 A1 | | 11/2004 | Fischer et al. | 280/739 |

FOREIGN PATENT DOCUMENTS

| | | |
|---|---|---|
| DE | 19912369 A1 | 10/2000 |
| EP | 1112902 A2 | 7/2001 |
| EP | 1112902 A3 | 7/2001 |
| GB | 2236419 | 4/1991 |
| GB | 2338214 A | 12/1999 |

* cited by examiner

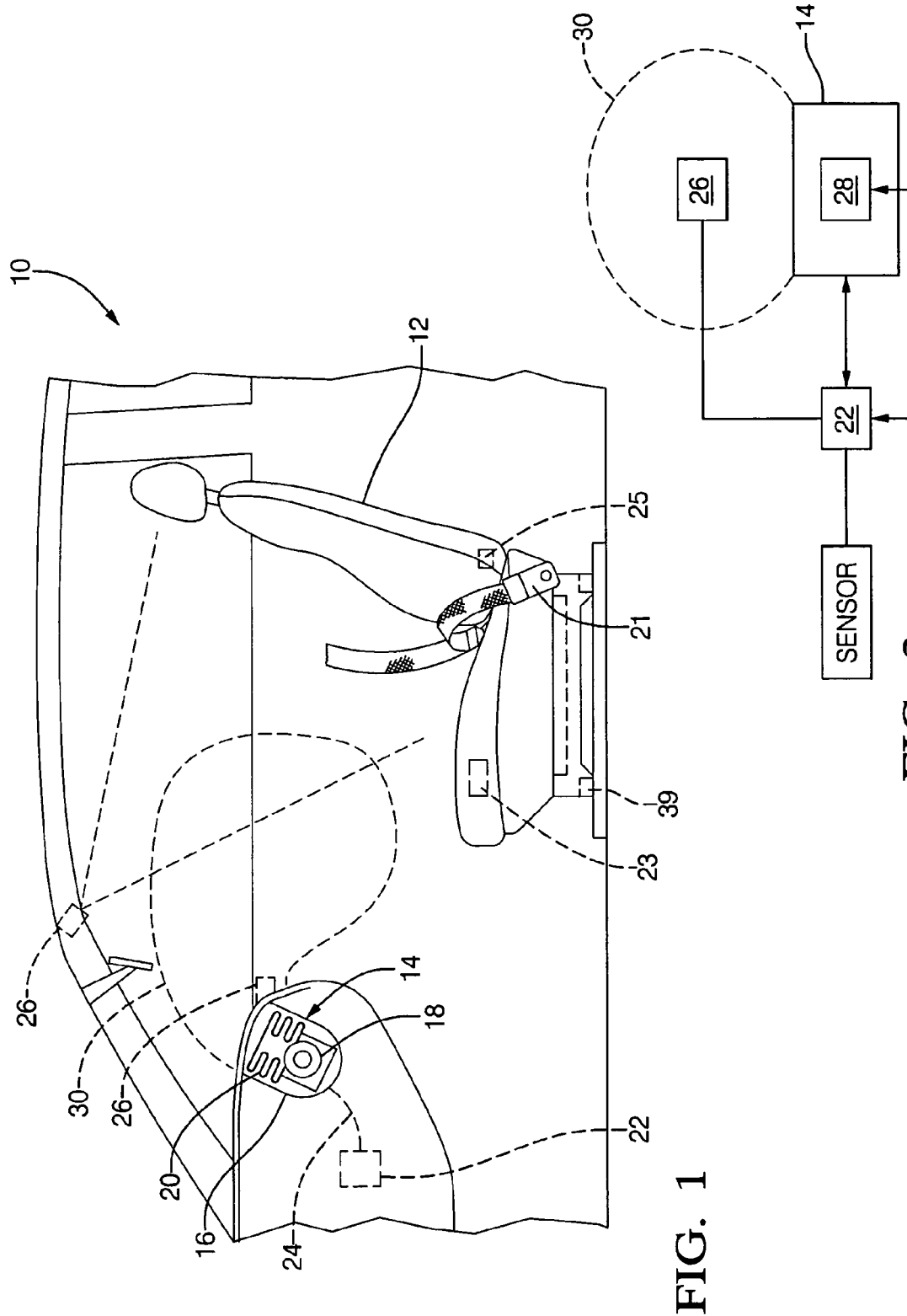

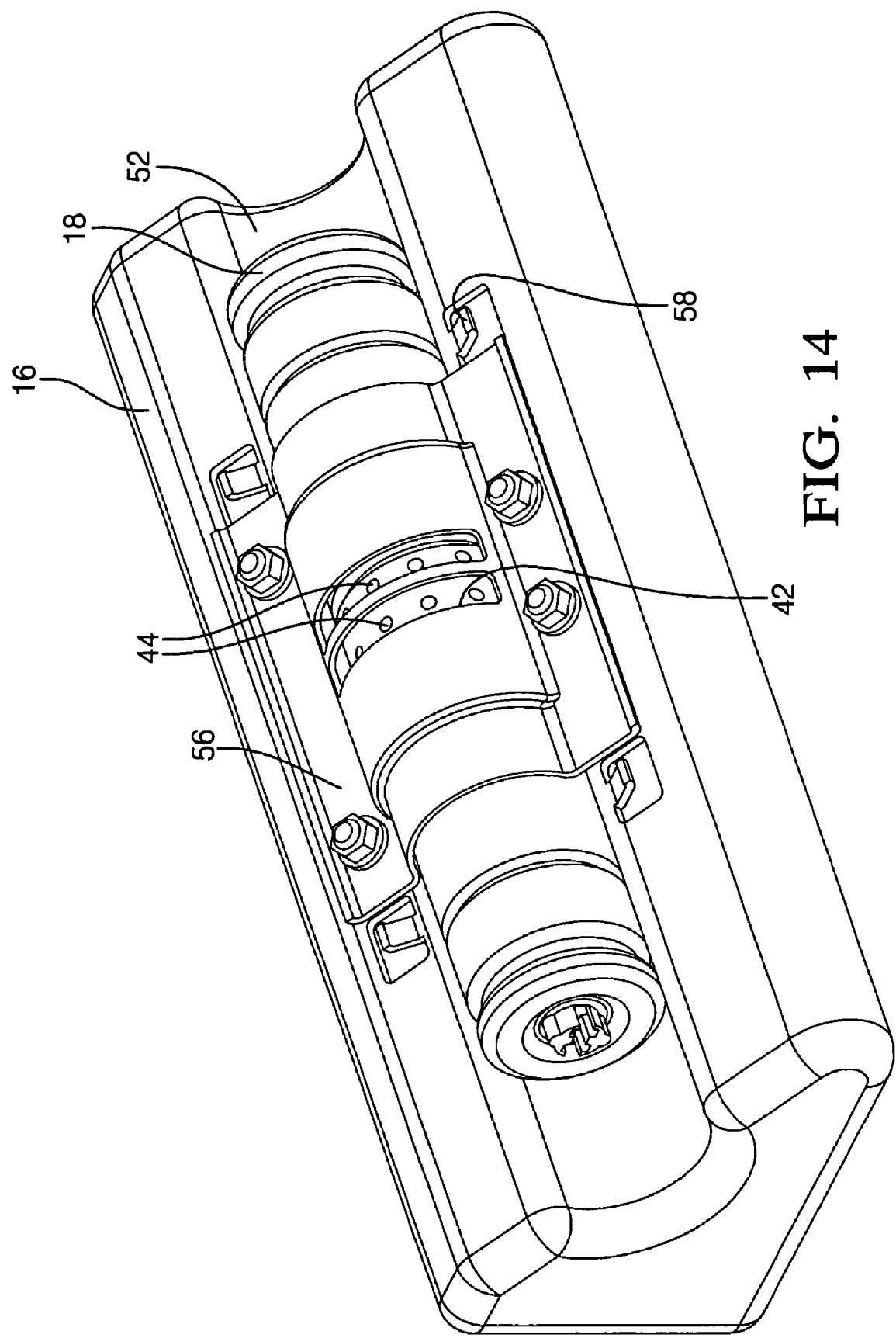

APPARATUS AND METHOD FOR CONTROLLING AN INFLATABLE CUSHION

CROSS REFERENCE TO RELATED APPLICATIONS

This application is related to U.S. Provisional application, Ser. No. 60/541,793, filed Feb. 4, 2004, the contents of which are incorporated herein by reference thereto.

This application claims the benefit of U.S. Provisional application, Ser. No. 60/640,377, filed Dec. 30, 2004, the contents of which are incorporated herein by reference thereto.

This application is a continuation-in-part of U.S. patent application Ser. No. 10/078,961, filed: Feb. 20, 2002 now U.S. Pat. No. 6,991,258, the contents of which are incorporated herein by reference thereto.

This application is a continuation-in-part of U.S. patent application Ser. No. 10/802,394, filed Mar. 17, 2004 now U.S. Pat. No. 7,188,862, the contents of which are incorporated herein by reference thereto.

This application is a continuation-in-part of U.S. patent application Ser. No. 10/905,959, filed Jan. 27, 2005, the contents of which are incorporated herein by reference thereto.

TECHNICAL FIELD

This present invention relates generally to airbags or inflatable cushions for vehicles. More specifically, the present invention relates to systems and methods for controlling the deployment of an inflatable cushion of an airbag module.

BACKGROUND

Airbag modules have become common in modern automobiles. An airbag module typically comprises an inflatable cushion and an inflator within a housing. The module is installed in a desired position within the vehicle, such as the steering wheel, the dashboard, the seat, vehicle doors, the A-pillar, the B-pillar, etc. and other locations. The inflatable cushion is stored in a folded position within the housing in fluid communication with the inflator. In response to an activation event or occurrence, a sensor provides a signal for activating the inflator. The inflator provides a supply of inflating gas to the cushion to inflate the cushion, deploying it from the housing into the vehicle.

Various methods have been employed to tie the inflation level of the inflatable cushion to specific conditions. For example, dual stage inflators have been used to increase or decrease the level of inflation of the inflatable cushion. Alternatively, variable venting schemes have been used to direct a portion of a generated inflation gas away from the cushion. Further, variable tethering systems have been used to restrict or vary the overall cushion volume.

In addition, many different electronic sensors have been investigated to reliably determine occupant proximity to the airbag. These include infrared light beams, ultrasonic, electric field, camera vision, capacitance, and radar.

Accordingly, it is desirable to provide an airbag module that is capable of determining if an occupant is proximate to the air bag module as well as varying the amount of inflation output or inflation energy provided to the inflatable cushion wherein multiple inputs are provided to determine the amount of inflation energy to be provided to the inflatable cushion.

SUMMARY

Disclosed herein is a device and method for manipulating the deployment characteristics of an inflatable cushion of an airbag module. In one embodiment the method utilizes two different sensing technologies.

Disclosed herein is a method to change the level of inflation of a passenger side airbag based on an occupant's position relative to the deploying cushion (all the way from suppression to full deployment). This method combines a low cost fully electronic proximity sensor and a low cost electro-mechanical sensing or all mechanical sensing element.

An electromechanical sensing system for use with an air bag module is provided. The system comprises: a first sensing device, the first sensing device being an electronic sensing device configured to detect the presence of an object proximate to the air bag module, when the inflatable cushion is in an un-inflated state, the first sensing device providing a suppression signal when an object is detected within an area proximate to the air bag module; a second sensing device, the second sensing device being a mechanical sensing device configured to detect whether a leading edge of the inflatable cushion has made contact with an object prior to the leading edge reaching a predetermined distance from the air bag module during inflation of the inflatable cushion, the second sensing device being disposed within the inflatable cushion and is configured to cause the inflation energy provided to the inflatable cushion to be varied when the leading edge of the inflatable cushion has made contact with an object prior to the leading edge reaching the predetermined distance from the air bag module; and a sensing and diagnostic module for receiving the suppression signal and an activation signal, wherein the activation signal corresponds to an event that requires inflation of the inflatable cushion in absence of the suppression signal and the sensing and diagnostic module is configured to determine whether the inflation gas is to be provided to the inflatable cushion.

In one exemplary embodiment a system for controlling an inflation output provided to an inflatable cushion of an air bag module is provided. The system comprising: a first sensing device, the first sensing device being an electronic sensing device configured to detect the presence of an object proximate to the air bag module, when the inflatable cushion is in an un-inflated state, the first sensing device providing a suppression signal when an object is detected within an area proximate to the air bag module; a second sensing device, the second sensing device being a mechanical sensing device configured to detect whether a leading edge of the inflatable cushion has made contact with an object prior to the leading edge reaching a predetermined distance from the air bag module during inflation of the inflatable cushion, the second sensing device being disposed within the inflatable cushion and is configured to cause the inflation output provided to the inflatable cushion to be varied when the leading edge of the inflatable cushion has made contact with an object prior to the leading edge reaching the predetermined distance from the air bag module; and a sensing and diagnostic module for receiving the suppression signal and an activation signal, wherein the activation signal corresponds to an event that requires inflation of inflatable cushion in absence of the suppression signal and the sensing and diagnostic module is configured to determine whether the inflation output is to be provided to the inflatable cushion.

In another exemplary embodiment an air bag module is provided. The air bag module comprising: a housing having at least one vent opening; an inflatable cushion being stored in an un-deployed position in the housing; an inflator for inflating the inflatable cushion, the inflator being in fluid communication with the inflatable cushion and having a plurality of inflation openings for allowing an inflation gas to pass therethrough, at least one of the plurality of inflation openings being in fluid communication with the at least one vent opening; a system for controlling an inflation output of the inflator, the system comprising: a first sensing device, the first sensing device being an electronic sensing device configured to detect the presence of an object proximate to the air bag module, when the inflatable cushion is in an un-inflated state, the first sensing device providing a suppression signal when an object is detected within an area proximate to the air bag module; a second sensing device, the second sensing device being a mechanical sensing device configured to detect whether a leading edge of the inflatable cushion has made contact with an object prior to the leading edge reaching a predetermined distance from the air bag module during inflation of the inflatable cushion, the second sensing device being disposed within the inflatable cushion and is configured to cause the inflation output provided to the inflatable cushion to be varied when the leading edge of the inflatable cushion has made contact with an object prior to the leading edge reaching the predetermined distance from the air bag module; and a sensing and diagnostic module for receiving the suppression signal and an activation signal, wherein the activation signal corresponds to an event that requires inflation of inflatable cushion in absence of the suppression signal and the sensing and diagnostic module is configured to determine whether the inflation output is to be provided to the inflatable cushion.

In another exemplary embodiment an air bag device is provided. The airbag device comprising: an inflatable cushion being configured for deployment from the air bag device; an inflator for inflating the inflatable cushion, the inflator being in fluid communication with the inflatable cushion, the inflator comprising a first initiator for initiating a first stage of inflation and a second initiator for use with the first initiator for initiating a second stage of inflation, the first stage of inflation providing a first inflation output to the inflatable cushion; and a system for controlling an inflation output provided by the inflator, the system comprising: a first sensing device, the first sensing device being an electronic sensing device configured to detect the presence of an object proximate to the air bag module, when the inflatable cushion is in an un-inflated state, the first sensing device providing a suppression signal when an object is detected within an area proximate to the air bag module; a second sensing device, the second sensing device being a mechanical sensing device configured to detect whether a leading edge of the inflatable cushion has made contact with an object prior to the leading edge reaching a predetermined distance from the air bag module during inflation of the inflatable cushion, the second sensing device being disposed within the inflatable cushion and is configured to cause the inflation output provided to the inflatable cushion to be varied when the leading edge of the inflatable cushion has made contact with an object prior to the leading edge reaching the predetermined distance from the air bag module; and a sensing and diagnostic module for receiving the suppression signal and an activation signal, wherein the activation signal corresponds to an event that requires inflation of inflatable cushion in absence of the suppression signal and the sensing and diagnostic module is configured to determine whether the inflation output is to be provided to the inflatable cushion; wherein the second sensing device is a deployable member disposed within the inflatable cushion, the deployable member being in fluid communication with the inflator, wherein the first stage of inflation causes the deployable member to inflate and deploy in a first direction; and wherein unobstructed deployment of the deployable member in the first direction will cause an activation signal to be sent to the second initiator to initiate the second stage of inflation.

In another exemplary embodiment a method for tailoring an inflation output supplied to an inflatable cushion of an airbag module is provided. The method comprising: determining if the vehicle is about to be placed into operation; scanning an area proximate to the airbag module with a first sensing device if the vehicle is placed into operation, wherein the first sensing device provides the suppression signal to the sensing and diagnostic module if the first sensing device detects an object within the area, wherein the sensing and diagnostic module will not deploy the inflatable cushion if the suppression signal has been received; waiting a first predetermined time period if the vehicle is still in operation and scanning the area again with the first sensing device, wherein the first sensing device provides the suppression signal to the sensing and diagnostic module if the first sensing device detects an object within the area and if the first sensing device has already provided the suppression signal to the sensing and diagnostic module otherwise the restricted deployment signal is provided to the sensing and diagnostic module wherein the sensing and diagnostic module will provide a signal to provide an initial inflation output to the inflatable cushion in the event the predetermined activation event is detected and a second sensing device disposed within the inflatable cushion will provide a means for tailoring a subsequent inflation output to the inflatable cushion, if no object is detected, the full deployment signal is provided to the sensing and diagnostic module wherein a full inflation output is provided to the inflatable cushion in the event the predetermined activation event is detected by the sensing and diagnostic module, the full inflation output being greater than the initial inflation output and the second sensing device disposed within the inflatable cushion will provide means for tailoring a subsequent inflation output to the inflatable cushion during the predetermined activation event, wherein the second sensing device tailors the subsequent inflation output if a leading edge of the inflating cushion encounters an object before reaching a predetermined distance away from the airbag module; waiting a second predetermined time period, the second predetermined time period being greater than the first predetermined time period and if the vehicle is still in operation, scanning the area again with the first sensing device, wherein the first sensing device provides the suppression signal to the sensing and diagnostic module if the first sensing device detects an object within the area and if the first sensing device has already provided the suppression signal to the sensing and diagnostic module otherwise the restricted deployment signal is provided to the sensing and diagnostic module wherein the sensing and diagnostic module will provide a signal to provide an initial inflation output to the inflatable cushion in the event the predetermined activation event is detected by the sensing and diagnostic module and the second sensing device disposed within the inflatable cushion will provide means for tailoring a subsequent inflation output to the inflatable cushion, if no object is detected, the full deployment signal is provided to the sensing and diagnostic module wherein a full inflation output is provided to the inflatable cushion in the event the predetermined activation event is detected by the sensing and diagnostic module, the full inflation output being greater than the initial inflation output and the second sensing device disposed within the inflatable cushion will provide means for tailoring a subsequent inflation output to the inflatable cushion during the predetermined activation event, wherein the second sensing device tailors the subsequent inflation output if a leading edge of the inflating cushion encounters an object before reaching a predetermined distance away from the airbag module; and waiting a third predetermined time period, the third predetermined time period being greater than the second predetermined time period and if the vehicle is still in operation, scanning the area again with the first sensing device, wherein the first sensing device provides the suppression signal to the sensing and diagnostic module if the first sensing device detects an object within the area and if the first sensing device has already provided the suppression signal to the sensing and diagnostic module otherwise the restricted deployment signal is provided to the sensing and diagnostic module wherein the sensing and diagnostic module will provide a signal to provide an initial inflation output to the inflatable cushion in the event the predetermined activation event is detected by the sensing and diagnostic module and the second sensing device disposed within the inflatable cushion will provide means for tailoring a subsequent inflation output to the inflatable cushion, if no object is detected, the full deployment signal is provided to the sensing and diagnostic module wherein a full inflation output is provided to the inflatable cushion in the event the predetermined activation event is detected by the sensing and diagnostic module, the full inflation output being greater than the initial inflation output and the second sensing device disposed within the inflatable cushion will provide means for tailoring a subsequent inflation output to the inflatable cushion during the predetermined activation event, wherein the second sensing device tailors the subsequent inflation output if a leading edge of the inflating cushion encounters an object before reaching a predetermined distance away from the airbag module, wherein this step is repeated until the sensing and diagnostic module receives a signal that the vehicle is no longer in operation.

The above-described and other features of the present disclosure will be appreciated and understood by those skilled in the art from the following detailed description, drawings, and appended claims.

DRAWINGS

FIG. 1 is a partial view of a vehicle interior showing an air bag cushion in a stored or un-deployed state;

FIG. 2 is a schematic illustration of an exemplary embodiment of the present invention;

FIG. 9A is an enlarged view of a portion of FIG. 9;

FIG. 14 is a rear perspective view of the airbag module illustrated in FIG. 11;

DESCRIPTION OF EXEMPLARY EMBODIMENTS

Figure 3:
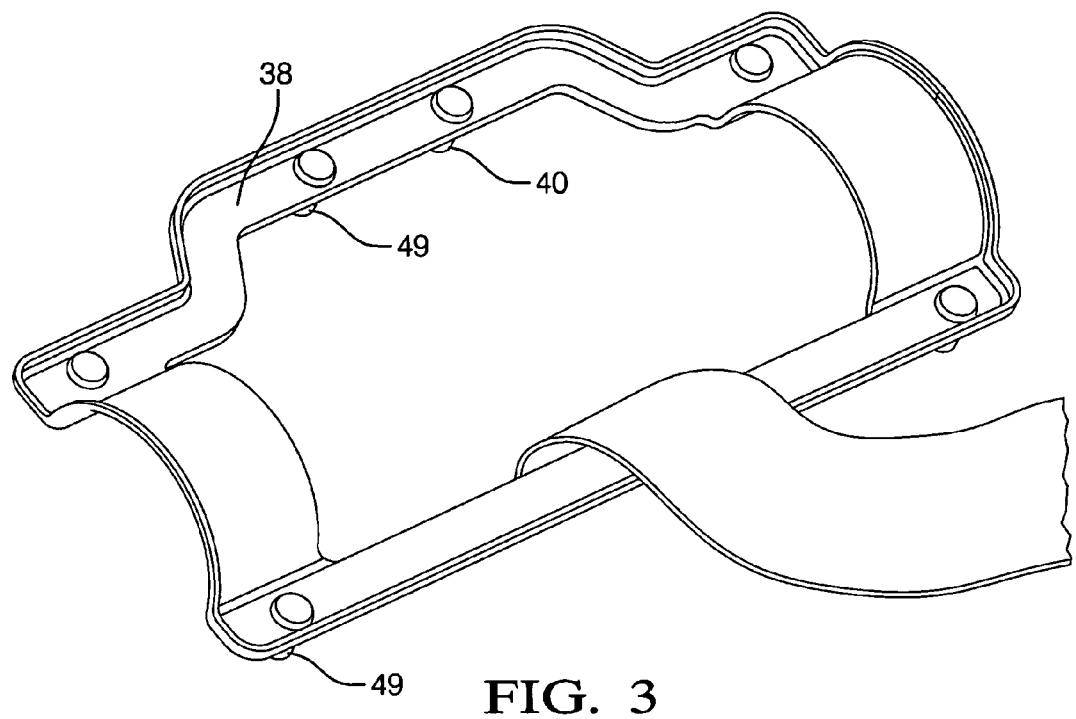
FIG. 3 is a perspective view of components of an airbag module constructed in accordance with one exemplary embodiment of the present invention.

Reference is made to the following commonly owned and assigned U.S. patent applications: Ser. No. 10/295,932, filed Nov. 15, 2002, Ser. No. 10/318,913, filed Dec. 13, 2003, Ser. No. 10/078,961 filed Feb. 20, 2002; Ser. No. 60/541,793, filed Feb. 4, 2004; Ser. No. 10/802,394, filed Mar. 11, 2004; and Ser. No. 10/905,959, filed Jan. 27, 2005, the contents each of which are incorporated herein by reference thereto.

Disclosed herein is a method and apparatus for selectively controlling the inflation energy or inflation gas provided to an inflatable cushion through the use of a combined mechanical and electronic sensing assembly or system.

Referring now to the Figures, and in particular to FIG. 1 a portion of an interior of a vehicle 10 is illustrated. Included in the interior compartment of vehicle 10 is a seating structure 12 and an air bag module 14 disposed in a selected spatial relationship with respect to seating structure 12. The air bag module 14 comprises a housing 16, an inflator 18, and an inflatable air bag or cushion 20. The module 14 is positioned in the vehicle 10 for deployment of the cushion 20 towards the seating structure 12.

A sensor or sensing-and-diagnostic module 22 is adapted to detect an activation event wherein the occurrence of a threshold event will cause an activation signal 24 or multiple signals (e.g., dual stage inflators or other activation devices, i.e., venting mechanisms) to be generated and received by the inflator 18 or other device, thereby causing the inflator to inflate the inflatable cushion by providing an inflation gas to the inflatable cushion. The detection of the threshold event is determined by one or more sensors that are disposed about the vehicle in accordance with known technologies. Thus, the activation signal or signals 24 controls the activation of the airbag module 14.

The inflatable cushion is stored in a folded or undeployed position in housing 16. The cushion is positioned to be in fluid communication with the inflator 18 wherein generation of the inflation output or inflating gas will cause the cushion to inflate. Upon detection of an activation event by the sensing-and-diagnostic module 22, the inflator 18 is activated via signal or signals 24 to generate the inflation gas or inflator output. The inflation gas or inflator output causes the cushion 20 to inflate and expand from housing 16 into the interior of the vehicle. It should be recognized that module 14 is illustrated by way of example only as being included in the dashboard of the vehicle. Of course, it is contemplated that module 14 can be installed for deployment in other regions of the vehicle, such as, but not limited to the steering wheel, the seat, the A-pillar, B-pillar etc., the roof, and other locations as well as other angular or positional relationships illustrated in FIG. 1. Moreover, the specific configurations of the vehicle interior, instrument panel, airbag module and relationship with regard to the same are provided as an example and it is, of course, understood that these configurations may vary from the specific configurations illustrated in FIG. 1.

Additionally, the present disclosure is also contemplated for use with various types of inflatable cushions and inflators. For example, cushions which are folded in a particular manner to achieve various deployment configurations and various types of inflators (e.g., dual stage inflators).

In addition, and in accordance with the present disclosure, the sensing-and-diagnostic module can also be adapted to detect one or more sensor inputs from a plurality of sensors.

Referring now to FIGS. 1 and 2 and in accordance with an exemplary embodiment, the sensing-and-diagnostic module receives inputs from a first sensing device 26 and a second sensing device 28. In accordance with an exemplary embodiment, first sensing device 26 is positioned to provide an input signal to module 22 indicative of one or more seat conditions and occupant location as well as size, including proximity to the air bag module. More particularly, first sensing device 26 is configured to provide a first signal indicative of whether an object or occupant is proximate to the airbag module. As shown, first sensing device 26 will provide a signal indicative of an object or occupant within an area 30 that is proximate to air bag module 14.

The signal of the first sensing device is inputted into a control algorithm resident upon a microprocessor disposed within the sensing and diagnostic module in order to determine a desired deployment scheme for the inflatable cushion, wherein at least one sensor mentioned above is combined with a mechanical sensor that is integral with the inflatable cushion and provides a signal or function during actual deployment of the inflatable cushion wherein the inflation energy provided to the cushion by the inflator is varied. For example, the data inputs when compared to a look up table stored in the memory of the microprocessor or other readable format will allow the algorithm to determine whether a full deployment or partial deployment of the airbag is desired (e.g., tailoring of the airbag module by activating or not activating a system designed to modify the cushion deployment characteristics). In addition, the algorithm will also determine whether suppression of the airbag module is desired.

As shown schematically in FIG. 2, first sensing device 26 is configured to provide a signal to sensing and diagnostic module 22 and second sensing device 28 is disposed within airbag module 14 and is configured to provide a signal to the sensing and diagnostic module 22 when the inflatable cushion of the air bag module is deployed. In addition, the second sensing device 28 will also provide a means for varying the inflation output being supplied to the inflatable cushion during inflation of the inflatable cushion.

In accordance with an exemplary embodiment, first sensing device 26 may comprise one of the following; an infrared sensor, an ultrasonic sensor, electronic field sensor. The first sensing device is positioned proximate to an external surface of the airbag module or the vehicle interior in close proximity to the airbag module. In this configuration, the first sensing device is configured to sample an area proximate to the airbag module. In an exemplary embodiment the first sensing device continuously samples area 30 for determining whether an object is located in area 30. In accordance with exemplary embodiments of the present invention first sensing device 26 samples area 30 continuously after a vehicle the module is disposed in is placed in drive or alternatively when an engine of the vehicle has been started and the vehicle begins to move. This can be determined by sensor outputs being provided to the sensing and diagnostic module (e.g., vehicle begins movement) and the sensing and diagnostic module instructs first sensing device 26 to begin monitoring area 30.

The continuous sampling by the first sensing device 26 allows the sensing and diagnostic module to be provided with various inputs before an activation event (deployment) occurs as well as providing inputs during the initial stages of the activation event. As will be discussed herein first sensing device 26 may provide a signal, which will cause sensing and diagnostic module 22 to provide a suppression signal to the air bag module in order to prevent the deployment of the same, if the appropriate signal is received. In accordance with an exemplary embodiment, first sensing device is configured to provide a suppression signal in the event a rear facing child seat is detected. Accordingly, area 30 is configured to be large enough to sense a portion of a rear facing child seat should the same be secured in the front passenger seat of a vehicle. Thus, the effective sensing areas of first sensing device 26 will be large enough to detect a rear facing child seat.

In an exemplary embodiment first sensing device 26 is an electronic sensor. The electronic sensor is used to determine if a rear facing child seat, child, or adult is in very close proximity to the airbag (e.g., within area 30). In this case the airbag is suppressed. Accordingly, first sensing device 26 monitors area 30 in order to make sure the same is free from objects that should not be within area 30 during deployment of the inflatable cushion. The suppression is caused by first sensing device 26 sending out a suppression signal to sensing and diagnostic module 22. Thus, in the event of a collision or predetermined activation event the airbag module will not be deployed. There are a number of non-contact proximity sensors which could be used as the first sensing device.

One contemplated type of sensor is an infrared (IR) sensor. This simple type of sensor is used in auto focus camera's to determine subject distance. A pulse of IR light is sent out from an LED. IR light reflected off the subject strikes a linear CCD array located a short distance from the LED. Near objects reflect light into the farther CCD elements and far objects reflect into the near elements. In this way the distance to the object is determined. The LED is pulsed to help eliminate background IR light from the distance determination. IR has the benefits of having low cost, small package, and relatively mature technology. In an exemplary embodiment, the IR sensor will be positioned to determine whether an object is in area 30. Contemplated locations of the IR sensor is illustrated by the dashed lines in FIG. 1. Of course, other locations are contemplated to be within the scope of the present invention.

Another contemplated sensing device for the first sensing device 26 is an ultrasonic sensor. This sensor uses a small piezoelectric element to drive a speaker to create a sound frequency above hearing range. The ultrasound transmits through the air and reflects back off of any object in the path. The same transducer is used to listen for the echoed ultrasound. Measuring the time between transmission and receiving the echo gives the obstruction distance. Ultrasonic has the benefits of low cost, small package size, and mature technology. Again, possible locations of first sensing device 26 are illustrated in FIG. 1. Most likely, the ultrasonic sensor must be visible with the vehicle such that the ultrasound frequencies may be directed into area 30.

Another contemplated device is radar. Similar to the ultrasonic sensor a radio wave is sent out and the echo signal is timed. This gives the distance to the object. The radar device can be used through the vehicle trim and therefore does not need to be visible. Still another device is a capacitance sensor. This type of sensor uses two plates and a dielectric material between the plates shaped in such a way as to create the electric field in the required range. An oscillating voltage is driven through this capacitor. Dielectric materials that enter the field of the capacitor cause a change in capacitance value, which is read as a shift in the frequency of the circuit. High water content objects (such as body parts) register well with this technology. This type of sensor would allow the same to be integrated within the airbag door (e.g., non-visible). Also, this type of device can be configured to distinguish plastic objects from body parts. However, the sensor may be affected by humidity changes therefore, it may require a self-correcting feature. Also, the field of the capacitor may be limited by the shape of the airbag door thereby affecting the size of area 30.

In conjunction with and as a supplement to first sensing device 26, second sensing device 28 is integrated into the deploying airbag. The second sensing device is a mechanical type device that provides an active sensing feature for the deploying air bag as well as providing actual deployment configurations of the inflatable cushion.

In one exemplary embodiment, second sensing device 28 comprises a tether that will vary the amount of inflation energy or inflator output provided to the inflatable cushion by either venting or redirecting some of the inflation output or by providing a signal to the sensing and diagnostic module in order to fire or not fire a second stage of a dual stage inflator as well as fire an actuator that controls a venting mechanism. In addition, the tether device may provide both functions. An example of contemplated tether devices are found in the following U.S. Pat. Nos. 6,808,205; 6,454,300; 6,422,593; and 6,390,502 the contents of which are incorporated herein by reference thereto.

In one embodiment, the tether has a predetermined length that is folded with the housing and the inflatable cushion. During an initial stage of deployment a vent opening in the housing is uncovered and as the cushion moves towards full deployment in a first direction, a portion of the tether is positioned to cover the vent opening. This is due to the tether being positioned proximate to the openings and the same is folded in such a manner that the tether does not block the vent opening until a predetermined amount of tether is un-ferruled by the inflating cushion. The movement or unraveling of the tether is facilitated by the inflating cushion. Thus, if inflation of the cushion in a first direction is obstructed the output of the inflator will be allowed to vent out of the vent opening of the housing.

An exemplary embodiment of the present invention shuts off or prevents direct venting of the inflator gas by means of a tether that closes off an opening in the housing directly aligned with the vents. Alternatively, the opening may be offset from vents of the inflator or a plurality of openings may be disposed in the housing some aligning with the vents of the diffuser and some not.

As the deployment begins, the vent will be open (or will open after minimal cushion travel to aid in deployment door opening) and inflation gas from the inflator will be allowed to exit through the housing by the vents of the inflator, which are in close proximity to the openings in the housing. This will occur for a short time until the cushion extends inwardly into the vehicle and the tether pulls the vent closed.

If the tether is not fully extended the vent will remain open and a large portion of the inflation energy will be vented out of the back side of the module. If on the other hand the tether is allowed to fully extend, the gas lost through venting will be less, and may be supplemented by a secondary stage of the inflator.

In accordance with one exemplary embodiment, the airbag module utilizes direct venting (e.g., alignment of a vent of the inflator with a vent opening in the housing). Accordingly, the module does not have to build pressure before it begins to vent. This is helpful in reducing the initial punchout that is seen with direct contact to the deployment door. Moreover, no electrical inputs or added firing loops or no additional parts are required in at least some embodiments. Exemplary embodiments will not add additional parts that may be capable of rattling and/or adding significant weight to the module.

Referring to the drawings and in particular FIGS. 3-10, one exemplary embodiment of an air bag module 14 is illustrated. The air bag module includes an outer housing 16 for mounting to, or proximate to an instrument panel or interior surface of a vehicle by suitable means such as fasteners. Of course, the module is contemplated for mounting to other structures in the vehicle. The housing is made of an easily molded or extruded rigid material such as plastic, steel, aluminum etc.

As will be described in detail below, air bag module 14 comprises means to customize or tailor the inflation level and venting of the inflatable cushion 20. The inflation level is commensurate with the deployment range of the inflatable cushion. More specifically, venting or lack thereof of inflation gas through an opening in the housing is determined by a fully inflated cushion 20 or a partially restrained cushion 20. The inflatable cushion is made of a fabric material such as nylon or polyester as is known in the art.

Figure 4:
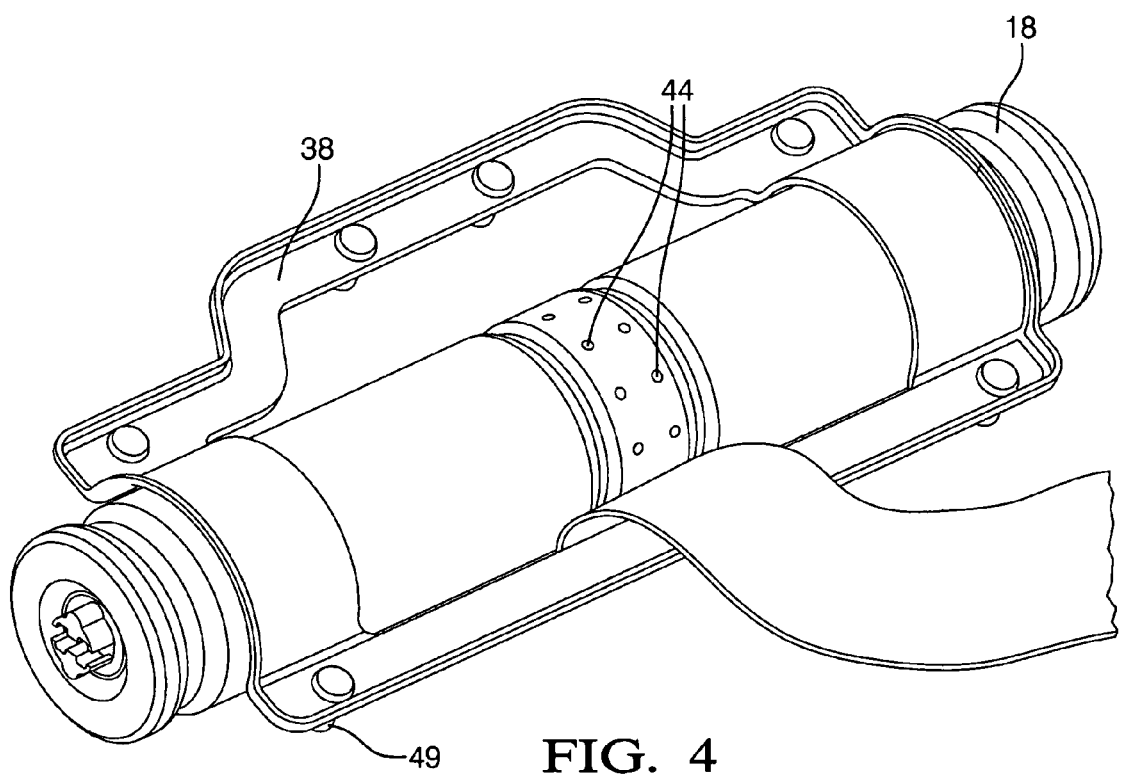
FIG. 4 is a perspective view of the components of FIG. 3 illustrated with an inflator of an airbag module constructed in accordance with an exemplary embodiment of the present invention.
Figure 5:
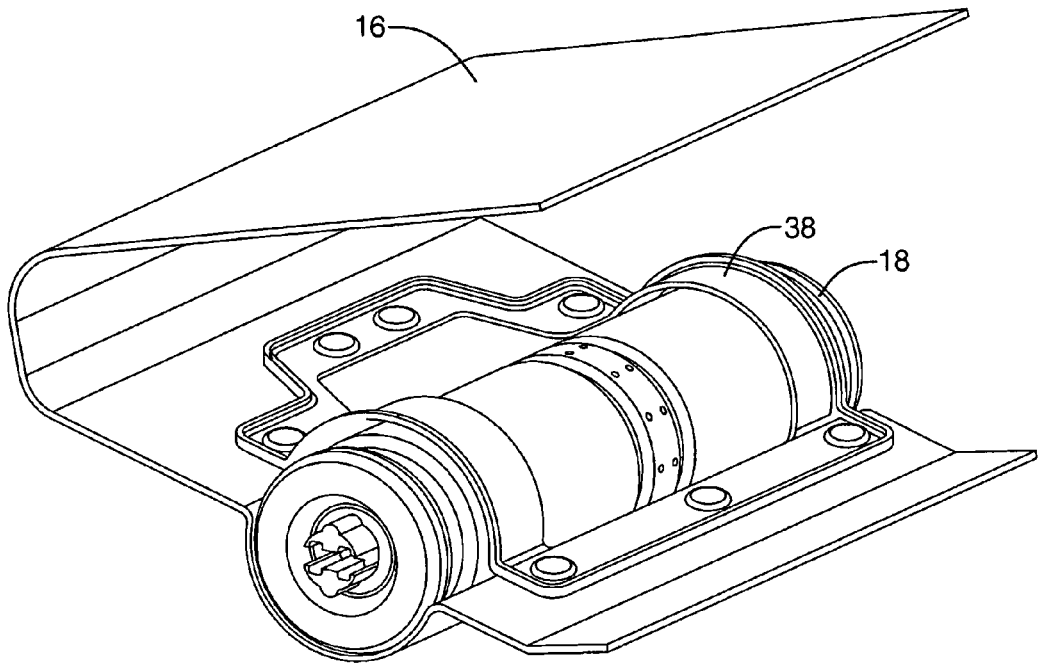
FIG. 5 is a perspective view of a partially assembled airbag module constructed in accordance with an exemplary embodiment of the present invention.

The inflatable cushion is mounted to housing 16 by a retainer 38. Retainer 38 is configured to be placed within an inflation opening of the inflatable cushion and comprises a plurality of studs or mounting means 49 which pass through openings in the inflatable cushion and secure the same to the housing by passing through openings in the housing. As illustrated in FIG. 4, a tether 40 or deployable member is illustrated. Tether 40 is secured to an inner surface of the inflatable cushion at one end and another portion of the airbag module at the other. For example retainer 38 may provide the means for securing the tether to the airbag module. In an exemplary embodiment tether 40 is secured to the inner surface of frontal surface of the inflatable cushion. As illustrated in FIGS. 3-5, retainer 38 is configured to wrap around and secure an inflator 18 to housing 16.

Figure 6:
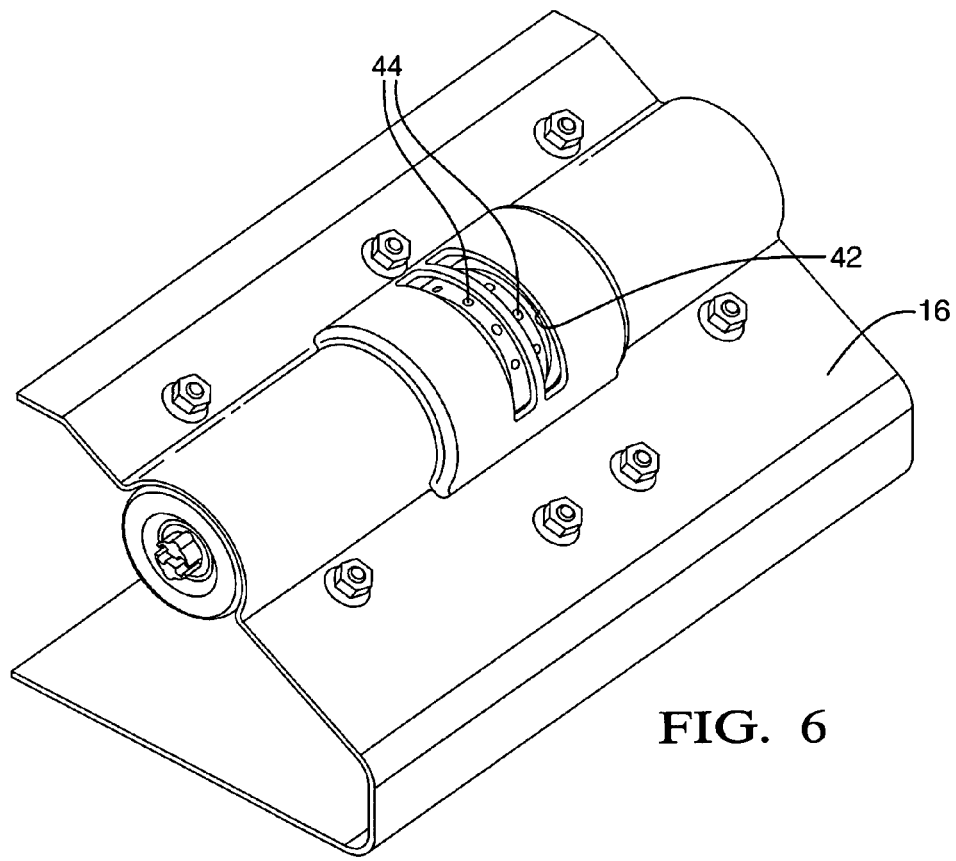
FIG. 6 is a rear perspective view of a partially assembled airbag module constructed in accordance with an exemplary embodiment of the present invention.
Figure 7:
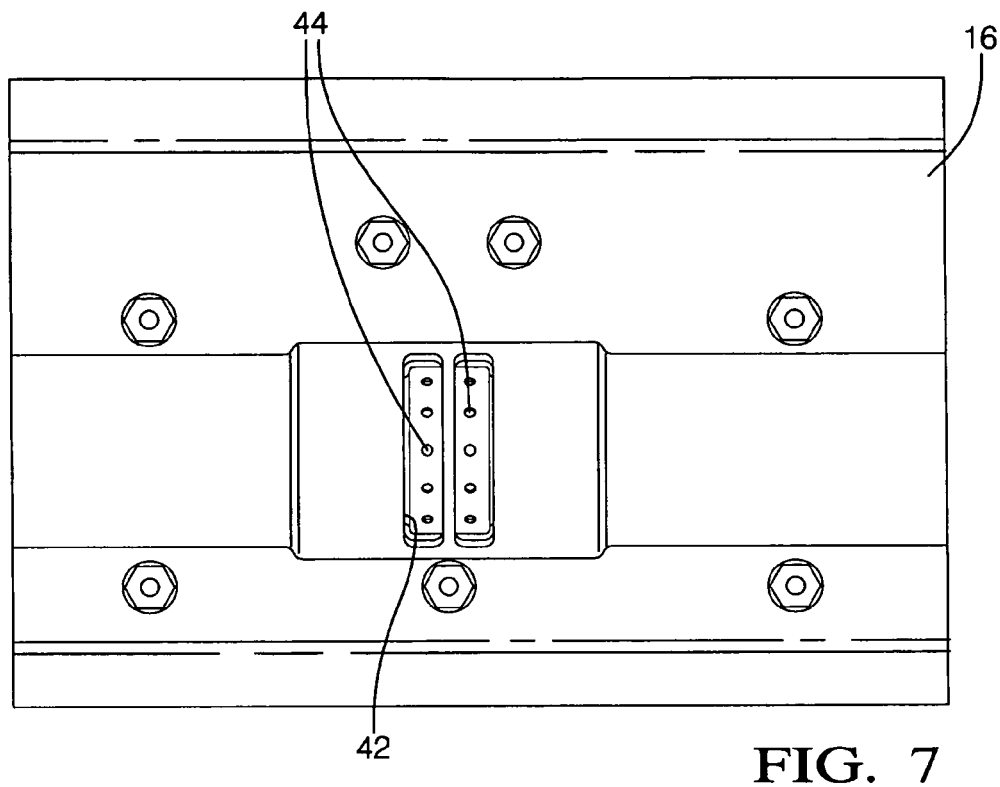
FIG. 7 is a rear view of an airbag module constructed in accordance with an exemplary embodiment of the present invention illustrating the vents openings of the housing in an uncovered state.
Figure 8:
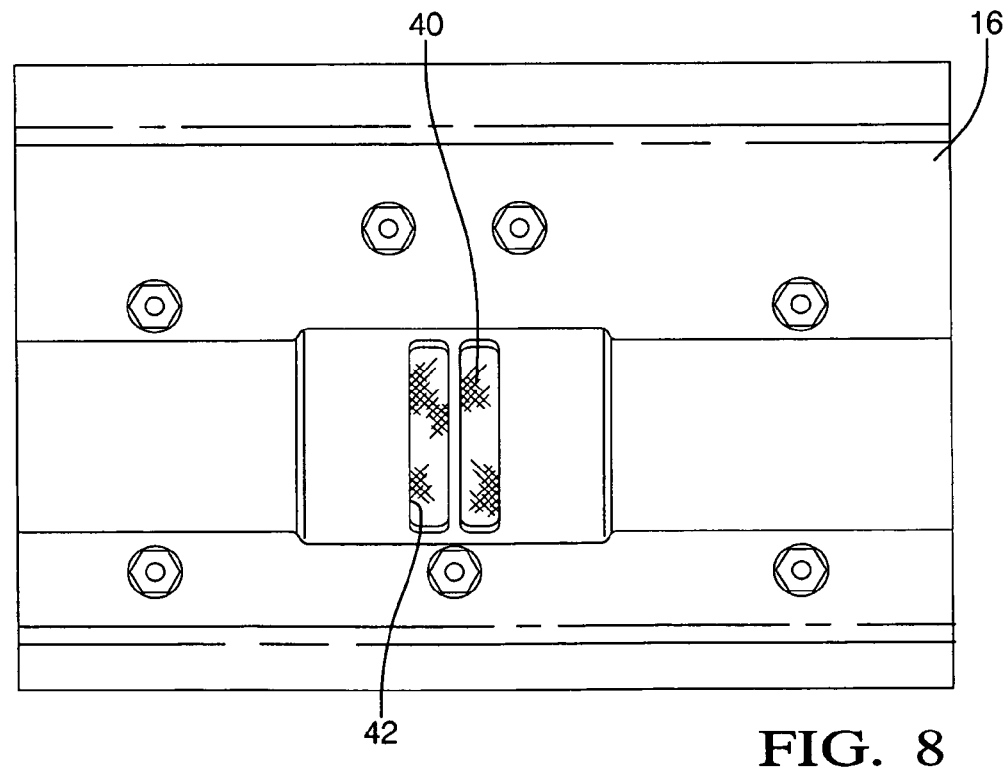
FIG. 8 is a rear view of an airbag module constructed in accordance with an exemplary embodiment of the present invention illustrating the vents openings of the housing in a covered state.

Referring now to FIGS. 6-8, a rear view of the airbag module is illustrated. As shown housing 16 has a vent opening or vent openings 42, which in accordance with an exemplary embodiment are positioned to align with a plurality of vent openings 44 of inflator 18. As shown in FIGS. 4-7 some of vent openings 44 are positioned to directly align with opening 42 as well as indirectly align with opening 42. Conversely some vent openings 44 are positioned to expel inflation gas into the opening of inflatable cushion 20.

Figure 9:
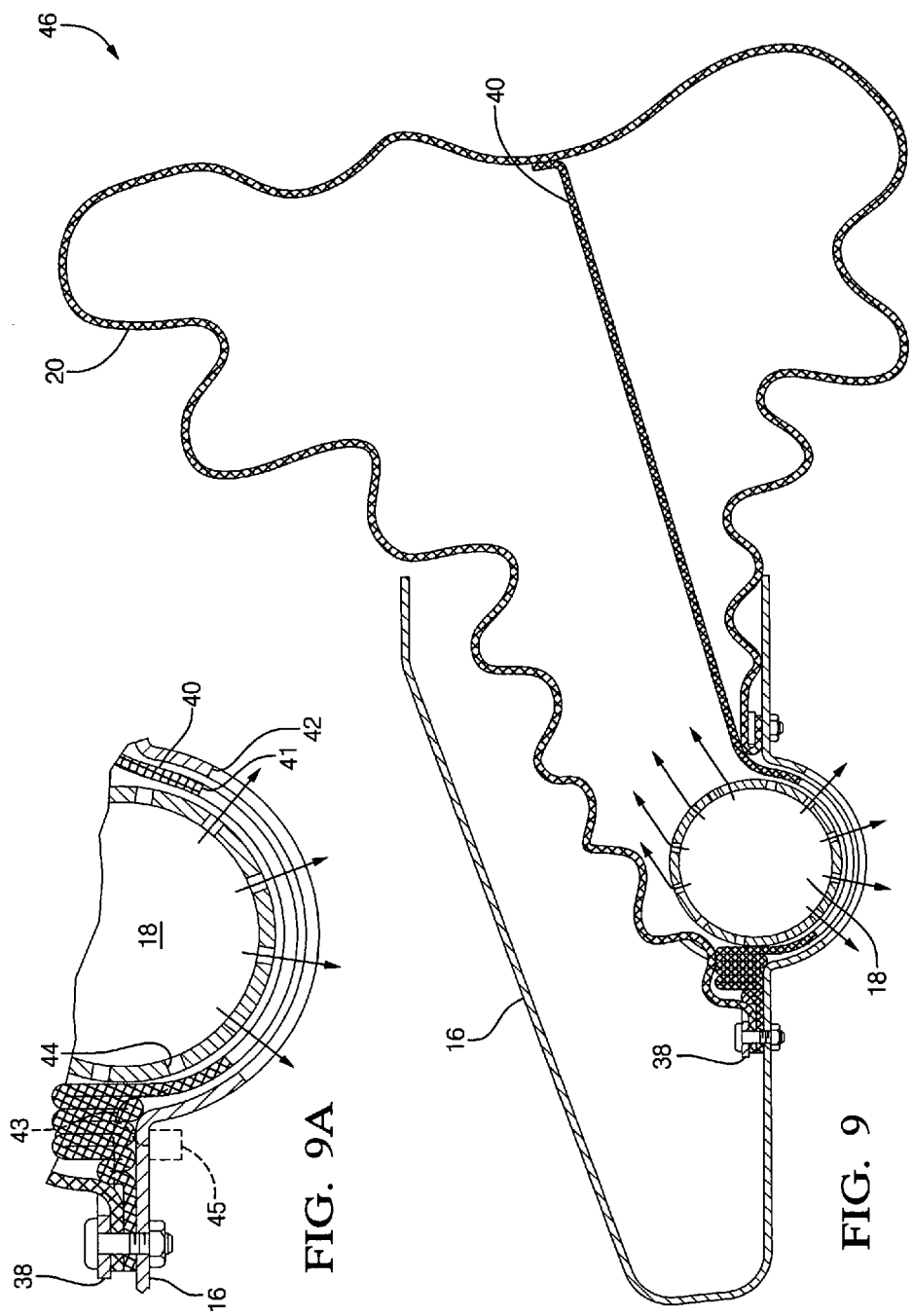
FIG. 9 is a cross sectional view of an airbag module in a first deployed state.
Figure 10:
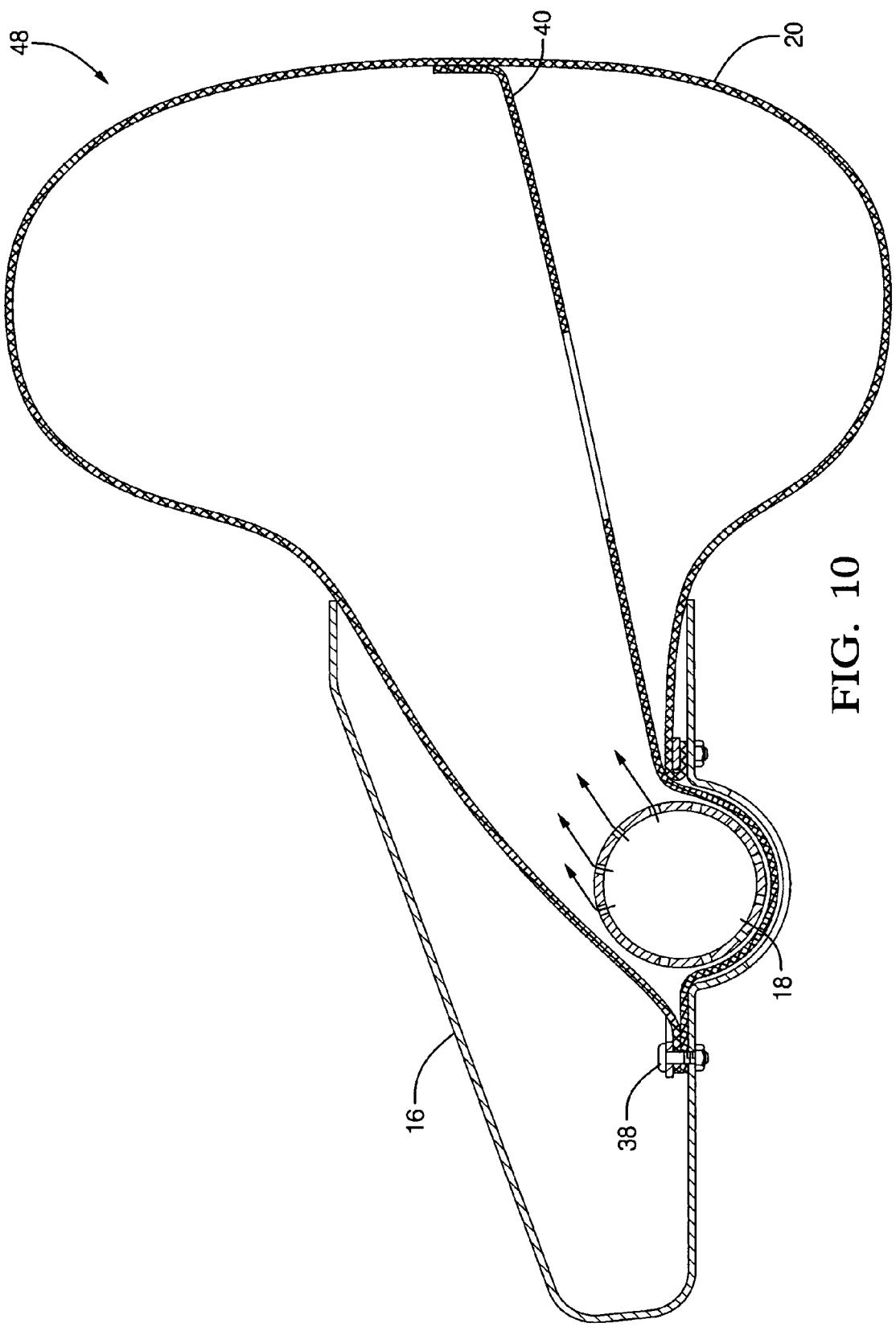
FIG. 10 is a cross sectional view of an airbag module in a second deployed state.

In order to provide two different levels of venting through openings 42, tether 40 adjusts the venting through the back side of the airbag module housing in accordance with a first expanded state/profile 46 (FIG. 9) or second expanded state/profile 48 (FIG. 10). For example, when the inflatable cushion is initially deployed and not yet fully inflated, tether 40 is secured to the module such that opening or openings 42 are not blocked by the tether; thus inflation gas may be expelled directly out of the airbag module housing (e.g., FIG. 9). This is facilitated by openings 41 in the tether which are aligned with openings 44 in the inflator and as discussed above are directly aligned with opening 42 in the housing. In addition, if the tether does not fully extend openings 42 allow inflation gas to be expelled from the housing as opposed to being expelled into the inflatable cushion.

Alternatively, and as illustrated in FIG. 10, when the inflatable cushion reaches its fully expanded state tether 40 is pulled taught and then covers openings 42 thereby directing more inflation gas into the cushion. This is facilitated by, when tether 40 is fully extended and openings 41 are no longer aligned with opening 42 and tether 40 is manufactured out of a material having characteristics for blocking the inflation gas from the openings of the inflator aligned with the opening in the housing. In order to prevent opening 42 from becoming blocked before tether 40 is fully extended, a portion of tether 40 is cinched up and stitched together with releasable threads 43 (e.g., threads that will break free when tether 40 is pulled taught). Alternatively, the tether is folded such that a portion of the tether proximate to the point of securement to the housing will not be unfurled or unfolded until the cushion reaches a full deployment.

Another embodiment of the present invention is the use of the tether with a dual stage inflator having a primary stage and a secondary stage wherein the primary stage provides a larger inflation output through a first plurality of openings in the inflator housing and, the secondary stage provides a smaller inflation output through a second plurality of openings in the inflator housing. In yet another embodiment, the primary stage and the secondary stage may provide equal inflation outputs.

Accordingly, the primary and secondary exit nozzles are separate (to a certain extent) from each other. For example, as illustrated in FIGS. 4-7, 10, 12 and 13, a first row of exit nozzles are disposed left of the center of the inflator and a second row of exit nozzles are disposed right of the center of the inflator. Accordingly, the first row of exit nozzles may comprise the primary exit nozzles and the second row of exit nozzles may comprise the secondary exit nozzles or vice versa. In yet another embodiment, the primary nozzles may be disposed proximate to the inflation opening of the inflatable cushion and the secondary nozzles may be disposed proximate to the back side of the inflator (e.g., facing away from the inflation opening of the inflatable cushion) or vice versa.

In any of the aforementioned embodiments, either the inflator's primary or secondary exit nozzles can be aligned with the vents on the back of the housing changing the cushion kinematics as well as the pressure. The features of this embodiment are achieved by directly aligning the housing vent opening, the tether opening for facilitating venting and the primary or secondary or both nozzles of the inflator.

The possibility of firing the primary or the secondary stage first also can be decided by the sensing and diagnostic module (SDM) based on the severity of the activation event and the multiple inputs of the multiple sensors as discussed above.

In accordance with one exemplary embodiment, and in order to provide the use of the tether as a sensor, the cushion is folded in the housing such that a portion of it extends out of the instrument panel first and after that portion reaches its rearward most extent, the remainder of the cushion feeds out radially or in other directions as opposed to those in the "x" direction. An example of such a cushion fold is illustrated in the Figures of FIG. 16 and an example of a deployment sequence is illustrated in FIGS. 17A-17C.

Figure 10A:
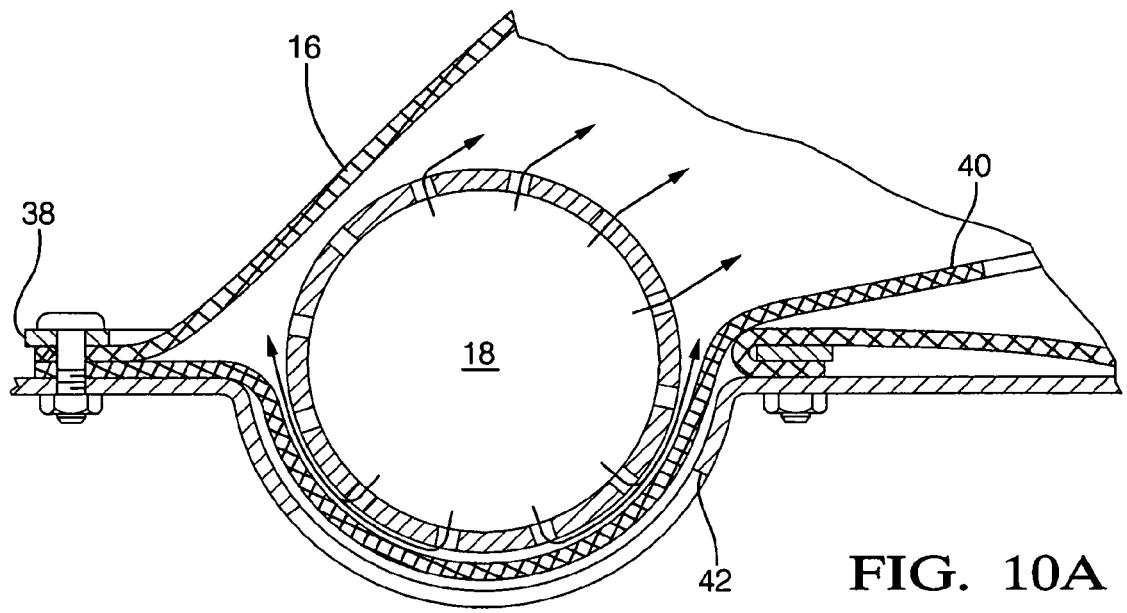
FIG. 10A is an enlarged view of a portion of FIG. 10.
Figure 11:
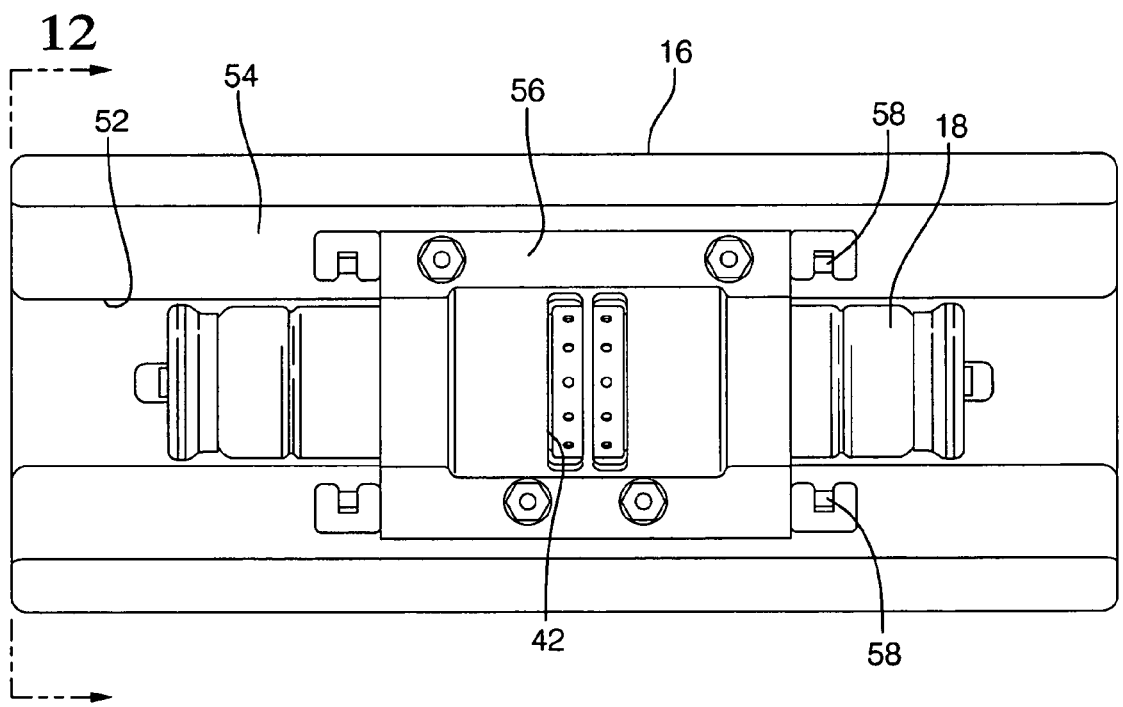
FIG. 11 is a rear view of an airbag module constructed in accordance with an alternative exemplary embodiment of the present invention illustrating the vents openings of the housing in an uncovered state.
Figure 12:
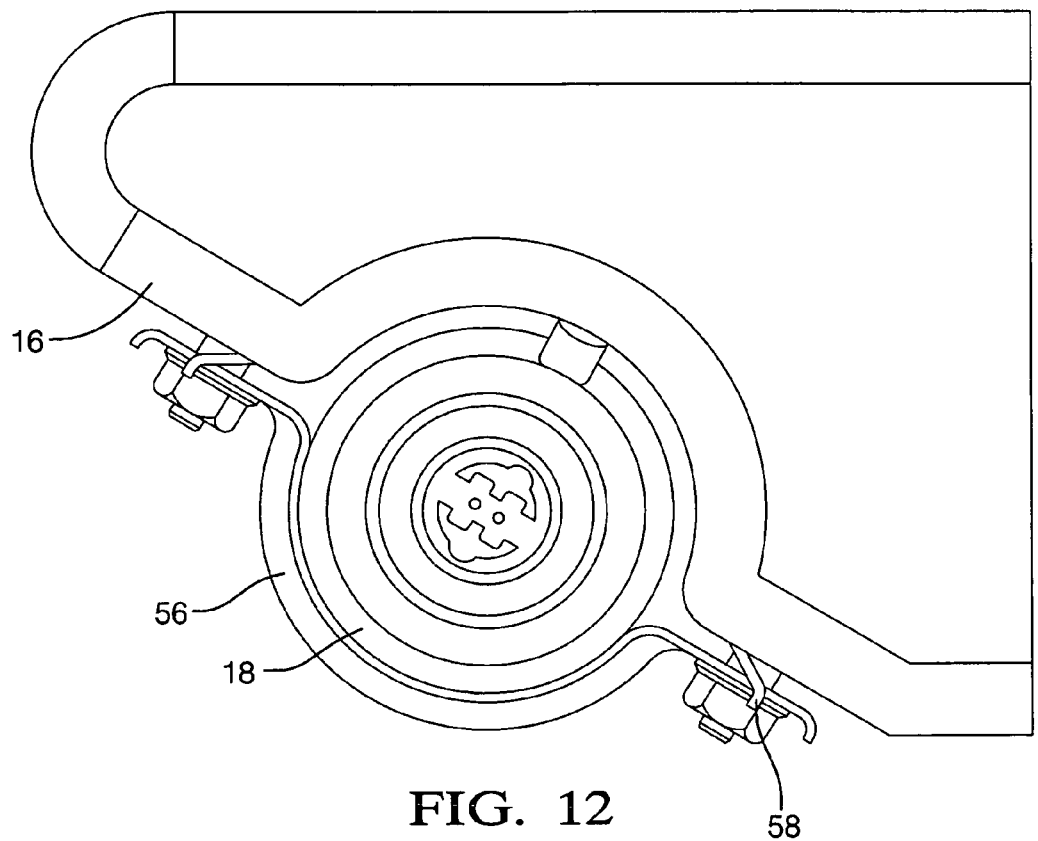
FIG. 12 is a view along lines 12-12 of FIG. 11.
Figure 13:
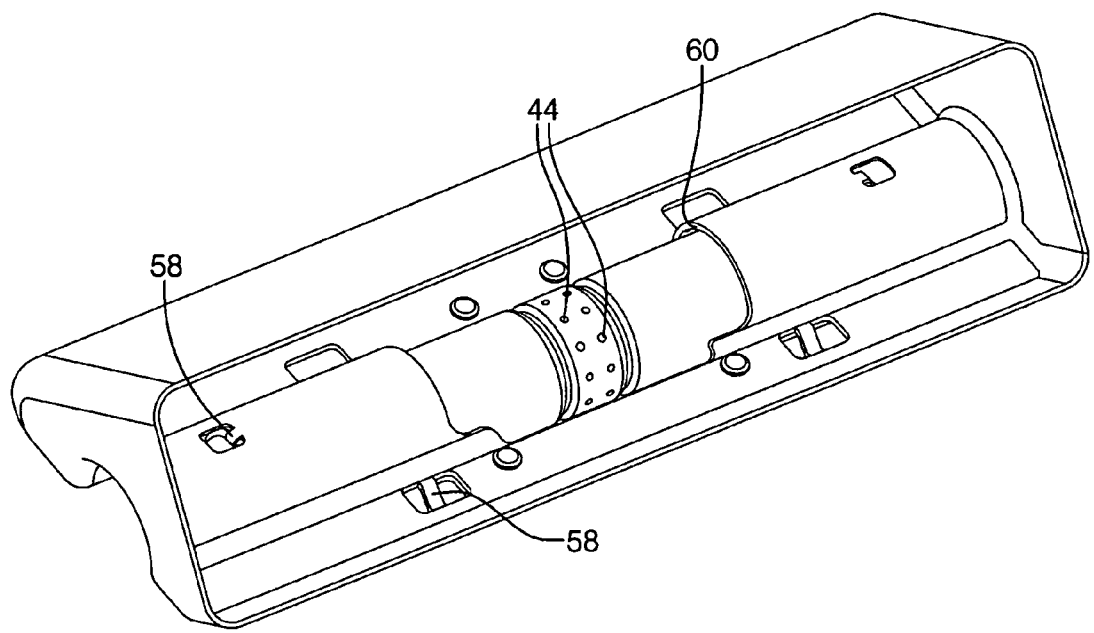
FIG. 13 is a front perspective view of the airbag module illustrated in FIG. 11.

In accordance with an alternative embodiment, the tether is arranged to have a first non-venting configuration (for example as illustrated in FIG. 10A), then a venting configuration (FIG. 9A) and then a non-venting configuration (FIG. 10A) upon full deployment of the tether. This is facilitated by folding and installing the tether such that the tether openings are not initially aligned with the inflator vents and the housing opening and as the cushion starts to deploy the tether is pulled into the configuration illustrated in FIG. 9A and if the cushion fully deploys the tether ultimately moves towards the configuration of FIG. 10A. This would allow extra inflation gas or pressure to build up in the housing during the initial break out phase of deployment (e.g., tearing of the door opening in the instrument panel. Moreover, one contemplated embodiment would be to prevent the tether from reaching the configuration of FIG. 9A until a portion of the cushion has passed through an opening in the instrument panel, this is facilitated by manipulating the length and folds of the tether.

Accordingly, and in any of the aforementioned embodiments tether 40 is indicative of the progress of the inflatable cushion into the vehicle and the tether provides a means for facilitating venting through the back side housing.

An assembly sequence of the embodiment of FIGS. 3-8 is as follows: placing the retainer inside the inflation opening of the inflatable cushion; pulling an attachment end of the tether out of the inflatable cushion, the other end of the tether being secured to the inside of the inflatable cushion by for example stitching; placing the inflator onto the cushion retainer and wrapping the tether around the inflator and attaching the tether to the securement studs of the cushion retainer; and then placing the cushion retainer, cushion and inflator assembly into the airbag module housing and fastening the same to the housing with a plurality of securement members such as nuts.

Thus, the tether is configured to adjust the venting based upon rearward excursion (e.g., movement towards the seating structure 12) of the cushion. As an alternative embodiment, tether 40 may comprise a semi permeable material, which acts like a filter for filtering combustion by-products of inflator 18 which may be exhausted out of openings 44 during the position of FIG. 9A or even FIG. 10A. In yet another alternative embodiment, tether 40 is configured and positioned to interact with an actuator or sensor 45 wherein movement of the tether away from a pre-deployment position to a fully deployed cushion (FIG. 9A-FIG. 10A) causes the tether to be moved away from a sensing device. The sensing device would then provide a signal indicative of this movement to a microcontroller or other equivalent device in order to provide a signal to another device such as a second stage inflator or initiator to provide additional inflation gases or another device for actuating a device for closing the vent openings in the housing.

One non-limiting example of such a configuration would be a magnetic member disposed in the tether and a Hall effect sensor positioned to sense the magnetic field of the magnet. Thus, when the magnet moves away the field changes and this is sensed by the sensor that provides an output signal. Another sensing device could be an actuator manipulated by the tether or a sensor disposed directly on the tether. In yet another alternative the sensor could comprise the stitching 43 that would provide a signal when it is torn. Such a signal is then sent to a sensing and diagnostic module or other microcontroller for use in a control algorithm which may instruct another device to be activated (e.g., firing of a second initiated in a two-stage inflator).

Referring now to FIGS. 11-14 an alternative exemplary embodiment is illustrated. Here a circular inflator similar to that of the embodiment of FIGS. 3-8 is mounted into an elongated channel 52 disposed on a back side 54 of an airbag module housing 16. Here inflator 18 is secured to the housing 16 by a mounting plate 56. Mounting plate 56 is configured to wrap around a portion of inflator 18 by having a curved receiving area for mating with a curved portion of the inflator. Mounting plate 56 is configured to have at least one opening 42 for aligning with vent openings 44 of inflator 18. As illustrated inflator 18 has two rows of vent openings disposed about the periphery of a central portion of the inflator and the two rows of vent openings are aligned with two elongated openings in mounting plate 56. Of course, this is but one configuration of the venting scheme of the inflator through the backing plate.

Housing 16 is also configured to have a plurality of integral mounting hooks 58 for airbag securement. In addition, and referring now to FIG. 13 a top view of housing 16 is illustrated. Here housing 16 is configured to have a central opening 60 for allowing the inflation gas of the inflator to enter into the inflatable cushion. Similar to the embodiment of FIGS. 3-10, at least one tether is secured to an inner surface of the inflatable cushion and as it is pulled taught the openings 42 of backing plate 56 will be sealed off from the exterior of the housing by a portion of the tether.

Figure 15A:
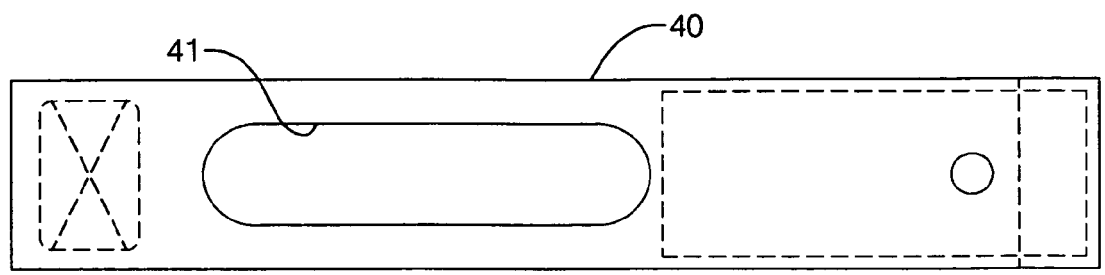
FIG. 15A is a top plan view of a sensor tether of one exemplary embodiment of the present invention.
Figure 15B:
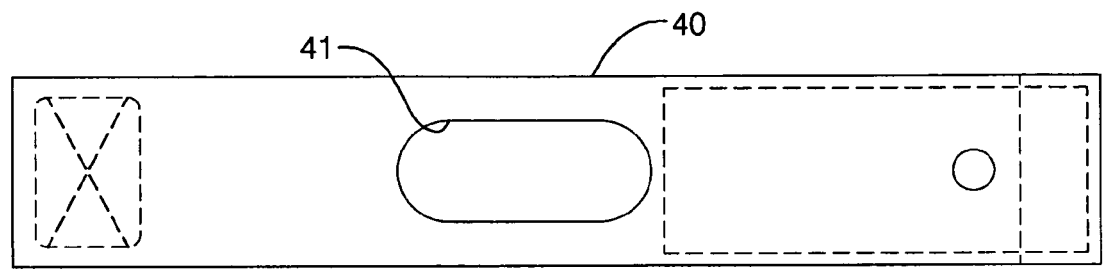
FIG. 15B is a top plan view of a sensor tether of another exemplary embodiment of the present invention.
Figure 16A:
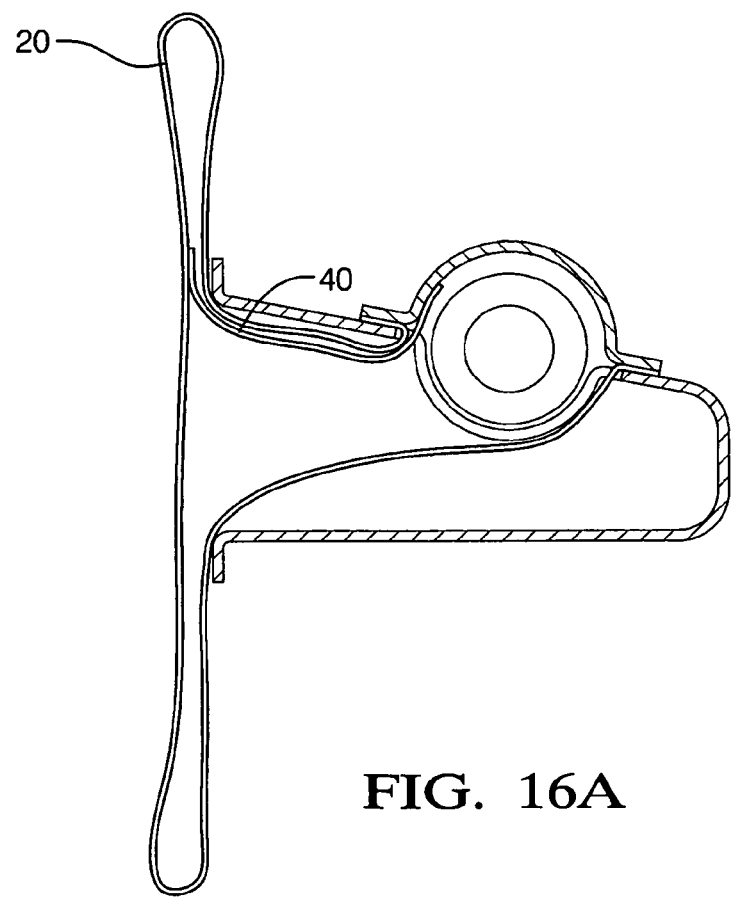
FIG. 16A-16E illustrate the folding of the inflatable cushion and the tether of an exemplary embodiment of the present invention.
Figure 16C:
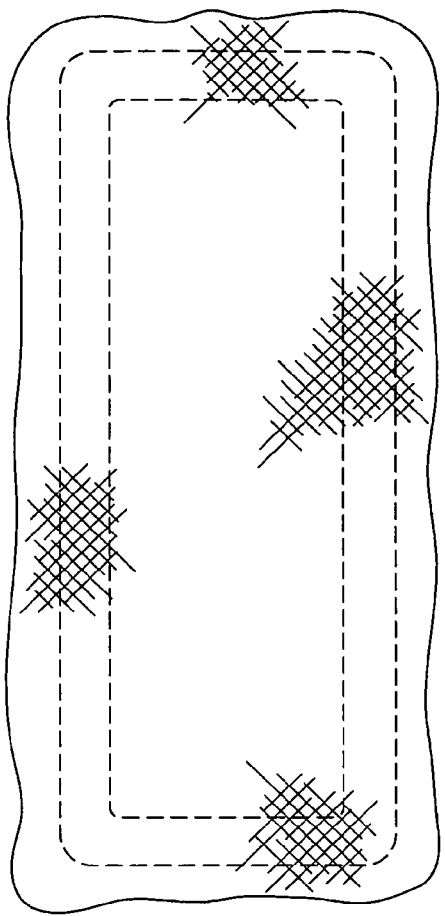
Figure 16E:
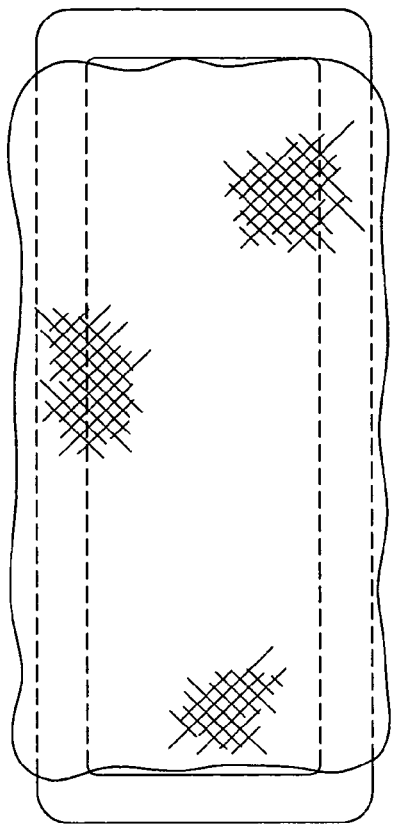
Figure 16B:
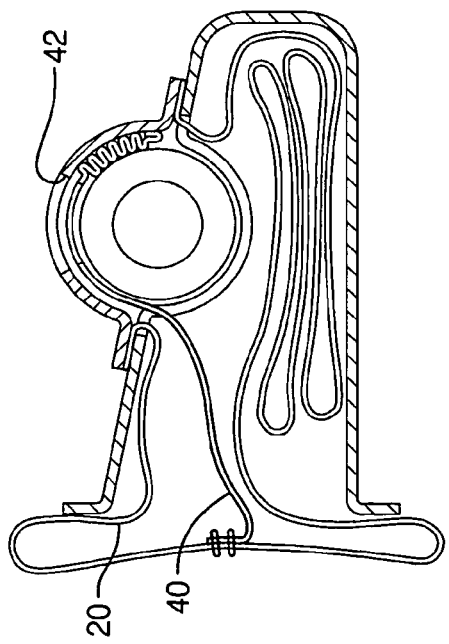
Figure 16D:
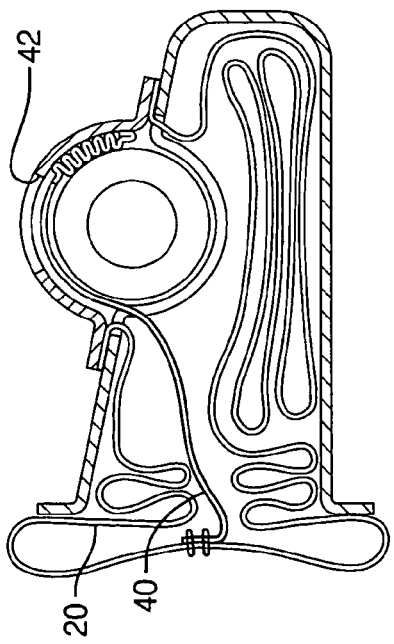

Referring now to FIGS. 15A and 15B, possible configurations for tether 40 are illustrated. It is, of course, understood that other configurations for tether 40 are contemplated to be within the scope of the present invention. Moreover, the specific dimensions illustrated in the attached Figures are intended to provide examples of exemplary embodiments however, other configurations and dimensions are considered to be within the scope of the present invention.

FIGS. 15A and 15B illustrate a point of securement of the tether to the interior surface of the inflatable cushion, and opening 41 in the tether is configured to provide venting when the tether or the opening is positioned between discharge vents of the inflator and the vent opening of the housing. Furthermore, the Figures also illustrate the securement point of the tether to the module, and opening for a stud of the retainer and a portion of the tether or which acts as the sealing member for blocking off the vent aperture of the housing.

It is understood that many variations or alternative exemplary embodiments are considered to be within the scope of the present invention, for example a single tether 40 may be used or alternatively additional tethers may be used within the inflatable cushion, the vent aperture of the tether may comprise a single elongated opening or a plurality of openings. For example, a plurality of openings may be used for venting or a plurality of openings may be used for venting and different employment stages of the tether. In addition, the tether may comprise multiple securement openings for engagement by multiple securement studs of the retainer or other securement means.

In addition, and in an alternative embodiment, the portion of the tether blocking the opening may be manufactured out of a material which provides a heat shield between the diffuser openings of the inflator and the vent opening of the housing.

As illustrated in the Figures of FIG. 16 and FIGS. 17A-17C, the tether and the inflatable cushion are folded in such a manner that the tether and the cushion are allowed to deploy partially through the airbag module and its deployable door (e.g., instrument panel, etc.) (FIG. 17A) wherein venting is allowed to occur through the vent opening of the housing as the cushion deploys to the configuration illustrated in FIG. 17B, a limit of travel in the "x" direction is met and the vent is closed by pulling the tether to its fully extended positioned such that the vent opening of the tether is no longer aligned with the vent opening of the housing and the inflator. At this point there is very little additional rearward excursion of the cushion and the cushion deploys radially outward or in other directions as opposed to the "x" direction wherein all of the, or substantially all of the inflation gases are now directed into the inflatable cushion (e.g., the transition from FIG. 17B to FIG. 17C).

Figure 17:
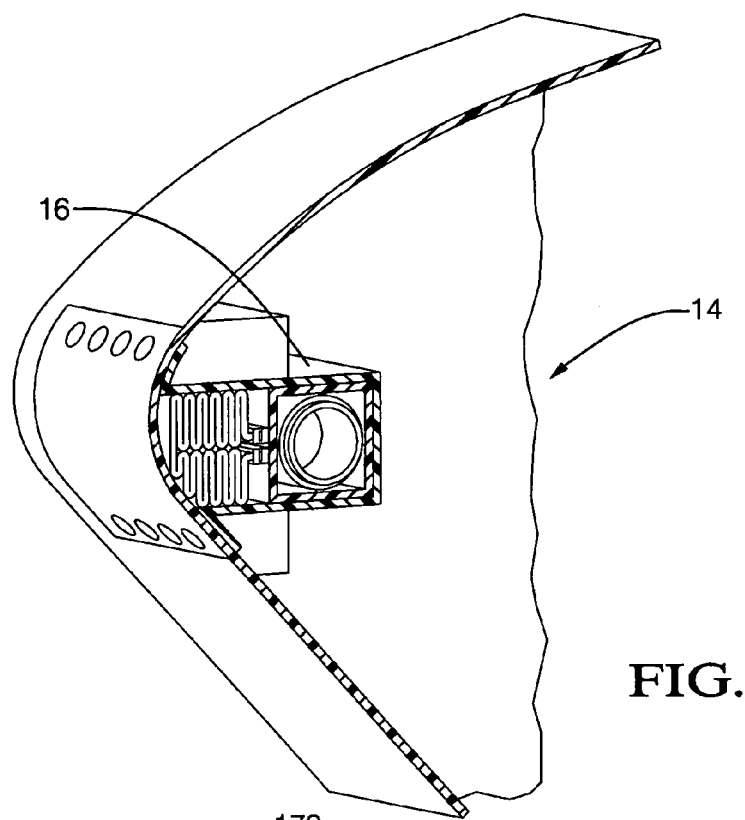
FIG. 17 is a partial cross-sectional view of an airbag module constructed in accordance with another exemplary embodiment of the present invention.

It is also noted that the inflator, the venting portion of the tether and the vent opening of the housing are capable of being disposed in any of the walls of the housing of the airbag module. For example, FIG. 9 shows the inflator secured to a lower surface of the housing while FIGS. 16 and 17 show the inflator secured to an upper surface of the housing. It is of course understood that the inflator can be also mounted to the portion of the housing between the bottom and top of the housing.

Accordingly, one exemplary embodiment of the present invention is directed to an assembly wherein the inflatable cushion deploys through a deployable door with a first inflation pressure and venting scheme and thereafter the cushion deploys in other non rearward directions with an inflation pressure and venting scheme that is determined by all or any one of the following items, sensor input, staged inflation and the position of the tether or tether sensor. Of course, other items may be included in accordance with the exemplary embodiments of the present invention to determine and provide the desired venting scheme.

In accordance with an alternative exemplary embodiment of the present invention and referring now to FIGS. 17-29, an alternative second sensing device 28 is illustrated. Here inflation energy or gas input to the cushion is controlled by an inner deployable member 140, which is second sensing device 28. The inner deployable member causes a sensing device 142 to provide a signal to the sensing and diagnostic module or directly to the inflator. It is also noted that sensing device 142 may be used with any of the aforementioned sensors to provide inputs or signals to the sensing and diagnostic module or alternatively sensing device 142 may be the only device used to determine whether a second stage of the inflator is to be activated. In accordance with an exemplary embodiment the signal generated by sensing device 142 is provided to the sensing and diagnostic module for use in control logic wherein the sensing and diagnostic module provides an activation signal to the second initiator if the required signals are received by the sensing and diagnostic module.

In an exemplary embodiment, the inflator is a dual stage inflator having a first initiator 144 for providing a first low inflation stage and a second initiator 146 for use with the first initiator in order to provide a second inflation stage. In an exemplary embodiment first initiator 144 and second initiator 146 are pyrotechnic squibs that fire in response to an activation signal. Of course, other equivalent devices are contemplated to be within the scope of the present invention. In one exemplary embodiment, the second inflation stage provides a higher level of inflator output to the inflatable cushion than the first inflation stage. An example of the inflator output or pressures provided by only the first initiator are approximately 227 kilopascal (kPa), measured in a 60 liter tank, while the inflator output or pressure provided by only the second initiator are 432 kPa for a total combined pressure of 615 kPa. Such a dual stage inflator is designated as a (615 kPa/227 Kpa) which means if the primary initiator or first initiator is fired 227 kPa will be generated in the 60 liter tank and if both the primary and secondary are fired 615 kPa will be generated in the 60 liter tank. Of course, it is understood that the pressures (e.g., inflator gas output) associated with the first and second initiators may vary to levels greater and less than the aforementioned values. In addition, and in alternative exemplary embodiments the pressures provided by the first initiator and the second initiator may be equal or alternatively the pressures provided by the first initiator may be greater than the second initiator.

The variation of the inflator output provided by the first and second initiators and resulting inflating energy provided to the inflating cushion may ultimately depend upon a variety of factors including the location of the airbag module within the vehicle and the possible locations of the vehicle seat. In an exemplary embodiment, the second inflation stage is provided to fully inflate the inflatable cushion to the configuration illustrated in FIG. 26. The gas volume delivered to the cushion (at a certain temperature and pressure) determines, in part, the energy an inflating cushion will generate. Accordingly, the amount of energy generated by the inflating cushion depends in part on the available volume as well as the inflator output and time after initial inflator activation. Exemplary embodiments of the present invention are directed to an inflatable or deployable member disposed within the inflatable cushion. The deployable member will be inflated when an activation signal is sent to the first initiator and the deployable member will provide an activation signal to the second initiator if the inflatable member is able to deploy in an un-obstructed manner. If, however, the deployable member does not deploy in an un-obstructed manner no activation signal will be sent to the second initiator and only the first initiator will be fired.

The air bag module includes an outer housing 16 for mounting to or proximate to an instrument panel or interior surface of a vehicle by suitable means such as fasteners. Of course, the module is contemplated for mounting to other structures in the vehicle. The housing is made of an easily molded or extruded rigid material such as plastic, steel, aluminum etc. As will be described in detail below, air bag module 14 comprises means to customize or tailor the inflation level of the inflatable cushion 20. The inflation level is commensurate with unobstructed deployment of the inflatable cushion. More specifically, and in accordance with an exemplary embodiment, deployable member 140 will deploy outwardly away from air bag module 14 in a first direction defined generally by arrow 148. Once deployable member reaches a full deployment defined by a distance "X" away from the airbag module, the fully and unobstructed deployment of deployable member 140 will cause sensing device 142 to generate a signal. The signal will indicate that deployable member has fully deployed or is unobstructed and the signal will cause second initiator 146 to fire thereby initiating the second stage of inflation wherein the inflatable cushion will reach its full deployment illustrated in FIG. 26.

In accordance with an exemplary embodiment, deployable member 140 will be fully inflated by the first low stage of inflation, which in one embodiment comprises approximately 30 percent of the overall inflator output generated by the inflator when both initiators are fired. Of course, the amount of inflator output corresponding to the first low inflation stage may vary to be greater or less than the aforementioned values. For example, the first low stage of inflation may comprise greater or less than 30 percent of the overall inflation output generated by the inflator if both initiators are fired. Other percentages include, but are not limited to, 50 percent of the overall inflation output of both initiators or, if applicable, greater than 50 percent of the overall inflation output or pressures provided by both initiators the inflator. In an exemplary embodiment both the inflatable cushion and the deployable member are made of a fabric material such as nylon or polyester.

Figure 18:
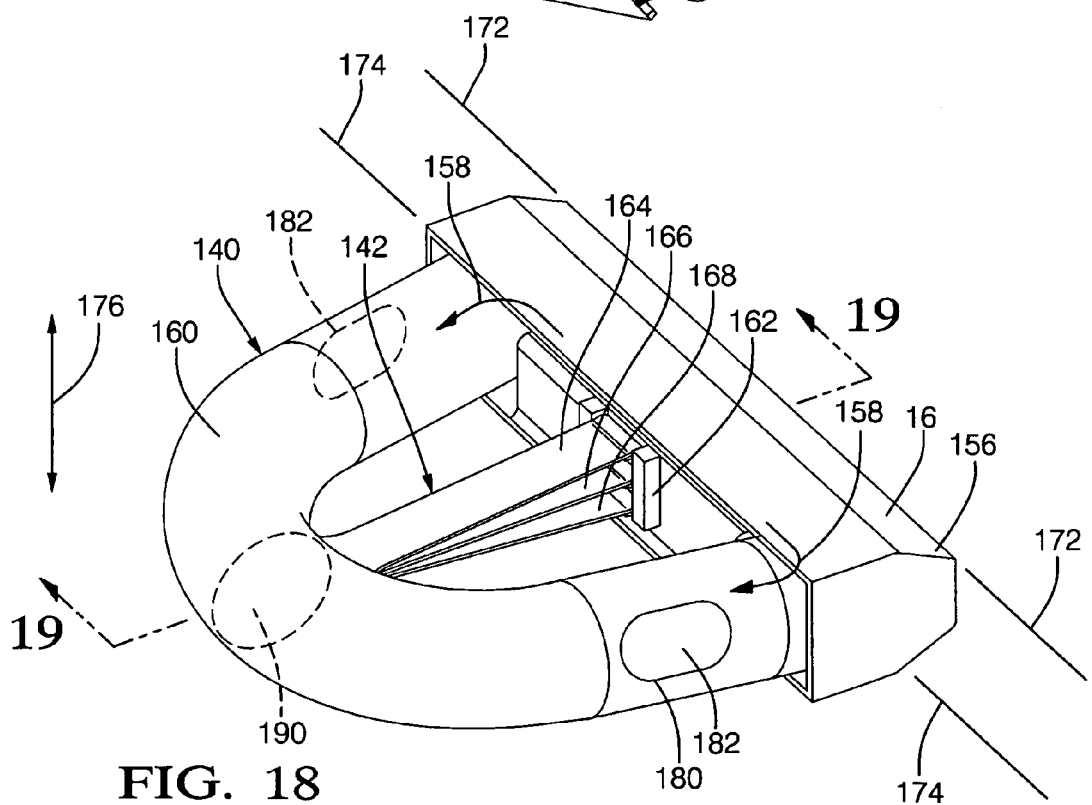
FIG. 18 is a perspective view of a deployable member for use in an airbag module in accordance with another exemplary embodiment of the present invention.

Referring back now to FIGS. 18-21, the inflatable cushion is mounted to housing 16 by a mounting member 150, which defines an inner area 152 for receiving inflator 18 therein. As illustrated, area 152 is open at either end and mounting member 150 comprises flange portions 154 that extend away from the openings into area 152. Flange portions 154 also provide a means for securing a portion of the deployable member to housing 16. The configuration of member 150 provides at least two functions, the first being the securement of the deployable member to the bottom wall 156 of the housing, while the second function is providing or defining a fluid flow path into openings of the deployable member that are disposed on either side of the inflator, which is located within area 152. It is also noted that in accordance with an exemplary embodiment inflator 18 is capable of providing inflation gas at both ends of opening 152. Thus, inflation gas from inflator 18 is directed in the direction of arrows 158 (FIG. 18). Accordingly, mounting member 150 provides a means for securing inflator 18 and deployable member 140 to housing 16 as well as defining fluid flow paths for deployable member 140.

Another feature of the dual inflation paths provided by member 150 and inflator 18 is that when the forward portion of the deployable member is deflected inwardly (FIG. 24) inflation paths remained unobstructed for the inflation gases of the first stage of inflation. This is provided by mounting a portion of the deployable member to the bottom wall as well as providing and defining the flow paths with flanges 154, which depend away from the openings of area 152.

Figure 19:
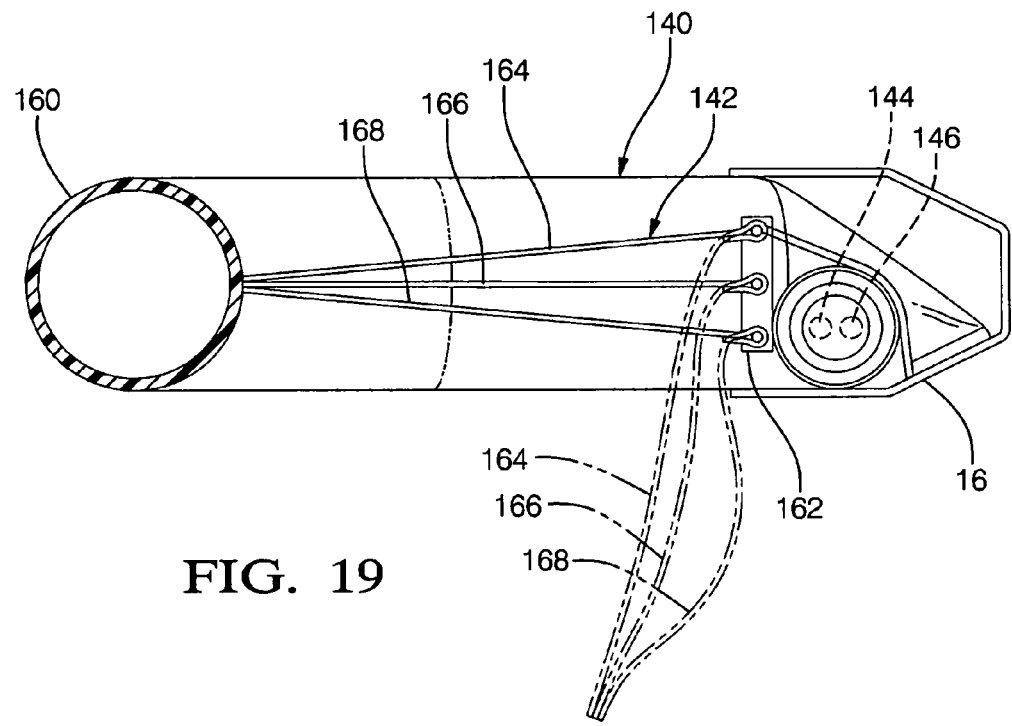
FIG. 19 is a view along lines 19-19 of FIG. 18.
Figure 20:
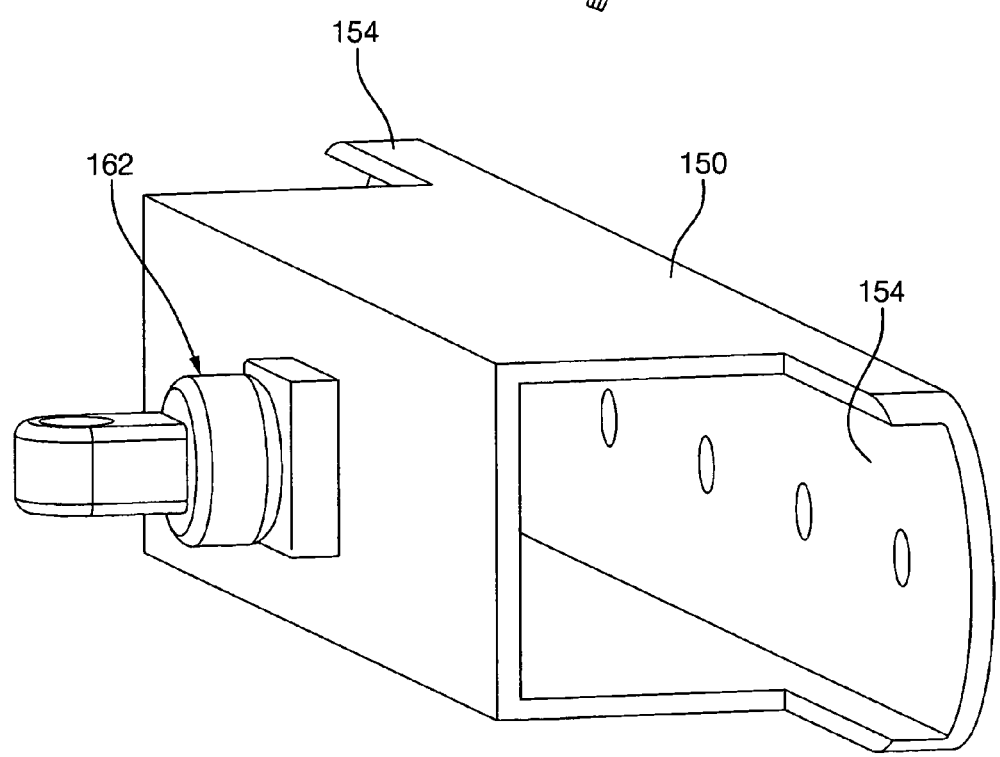
FIG. 20 is a perspective view of a component part of an airbag module constructed in accordance with the embodiment of the FIG. 17.
Figure 21:
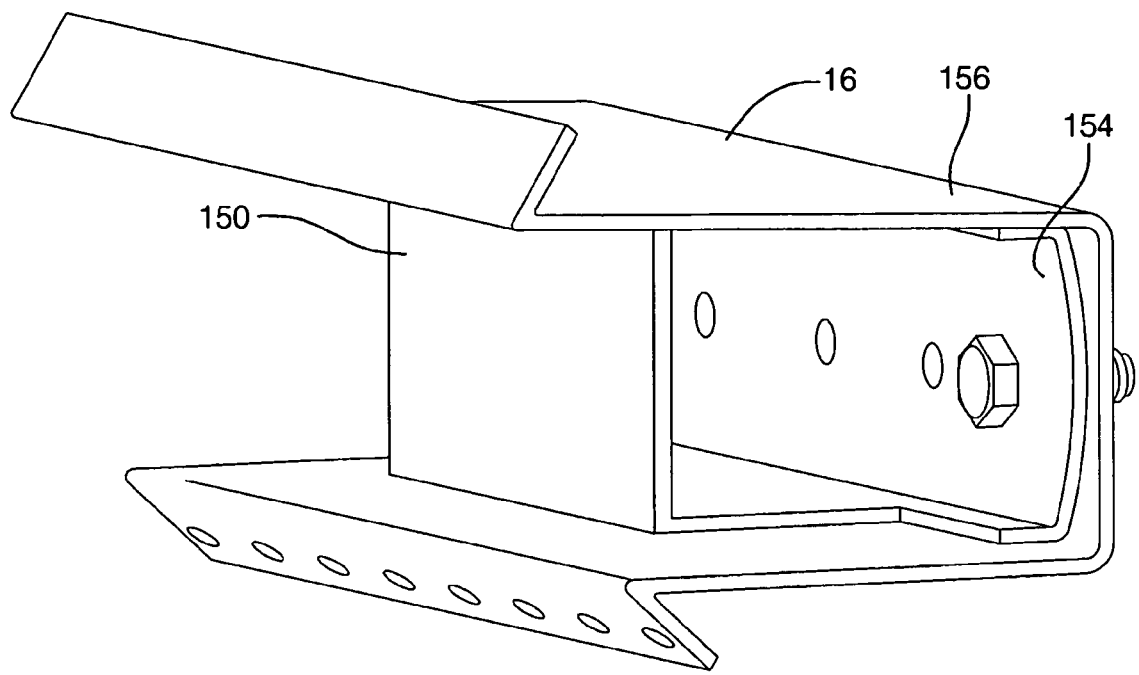
FIG. 21 is a perspective view of component parts of an airbag module constructed in accordance with the embodiment of FIG. 17.
Figure 22:
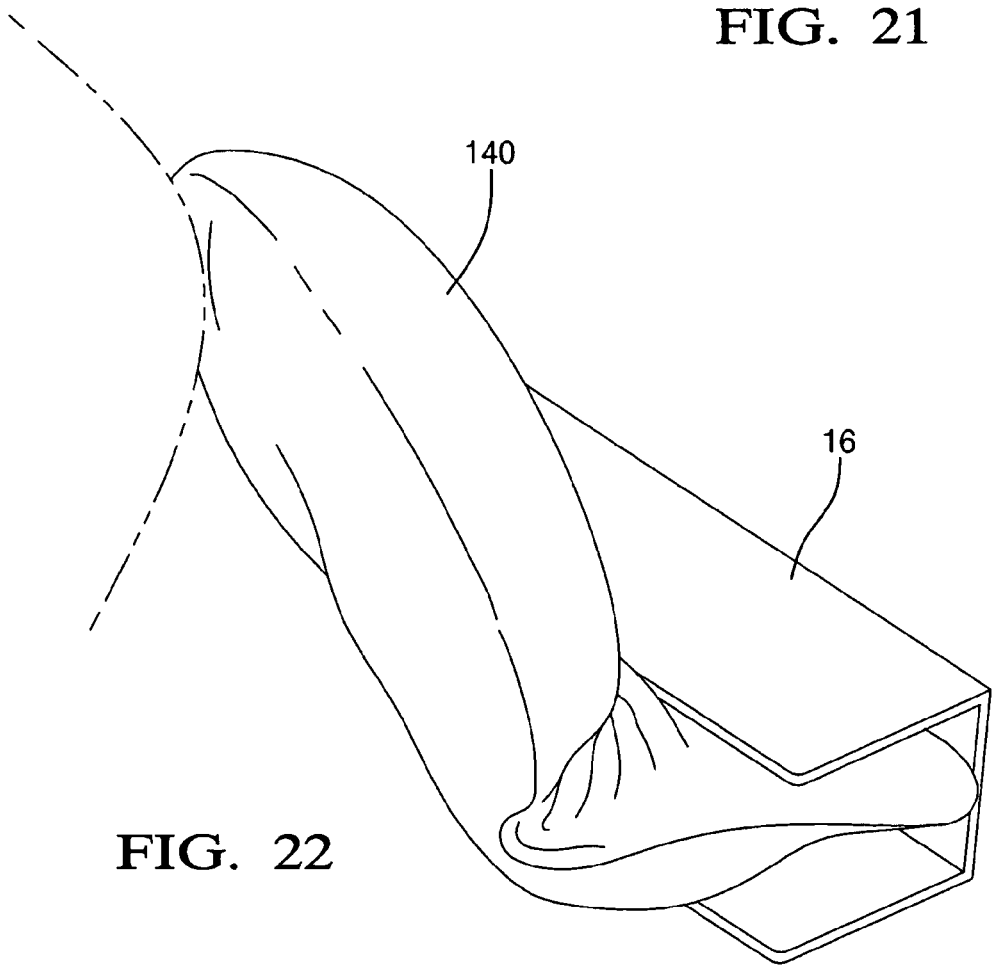
FIGS. 22-25 illustrate obstructed deployment of the deployable member of the FIG. 17 embodiment.
Figure 23:
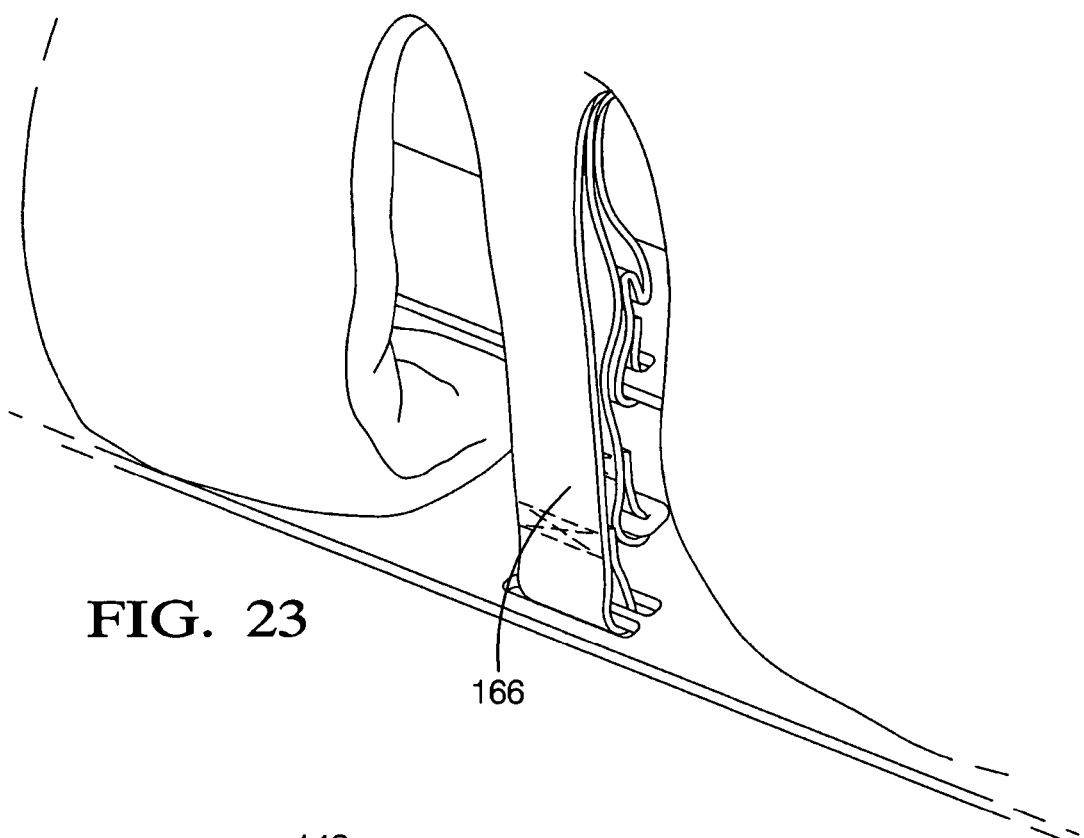

Referring now to FIGS. 18 and 19 a fully inflated deployable member 140 is illustrated. As shown, deployable member 140 comprises an inflatable structure with a forward end 160, which in accordance with an exemplary embodiment projects outwardly in a first direction as deployable member 140 is inflated in accordance with a first stage of inflation provided by inflator 18. As illustrated in FIGS. 18 and 19, deployable member 140 is in an unobstructed deployment configuration. Upon reaching this deployment configuration sensing device 142 will cause a signal to be generated by a sensing element 162. In accordance with an exemplary embodiment, sensing device 142 comprises an upper tether 164, a lower tether 166 and a central tether 168. Each of the aforementioned tethers are secured to the deployable member proximate to forward portion 160 and center tether 168 is shorter than upper and lower tethers 164 and 166 such that when deployable member 140 reaches the configuration illustrated in FIGS. 18 and 19, central tether 168 will provide a pulling force to sensing element 162 such that a signal will be generated to cause the second initiator and ultimately the second stage of inflation to occur. Conversely, and if sensing element 162 does not generate such a signal the second initiator and the second stage of inflation will not occur. Therefore, unobstructed deployment of deployable member 140 must occur before initiation of the second stage of inflation.

Figure 24:
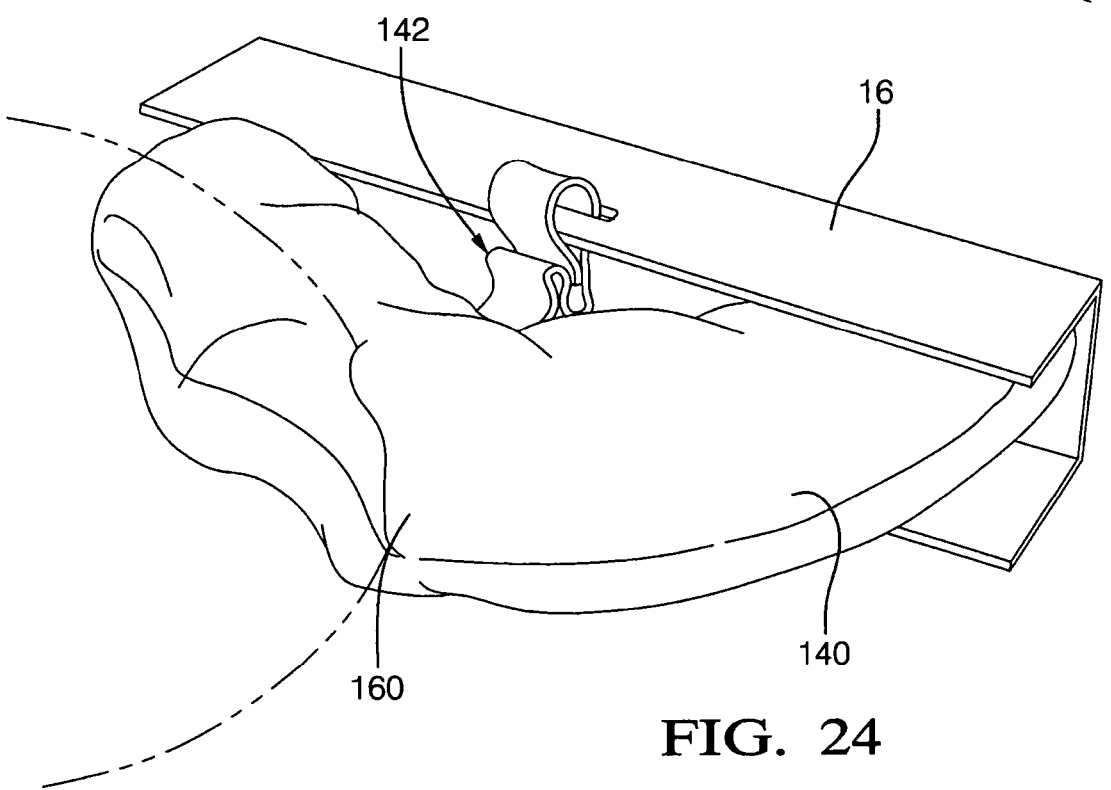
Figure 25:
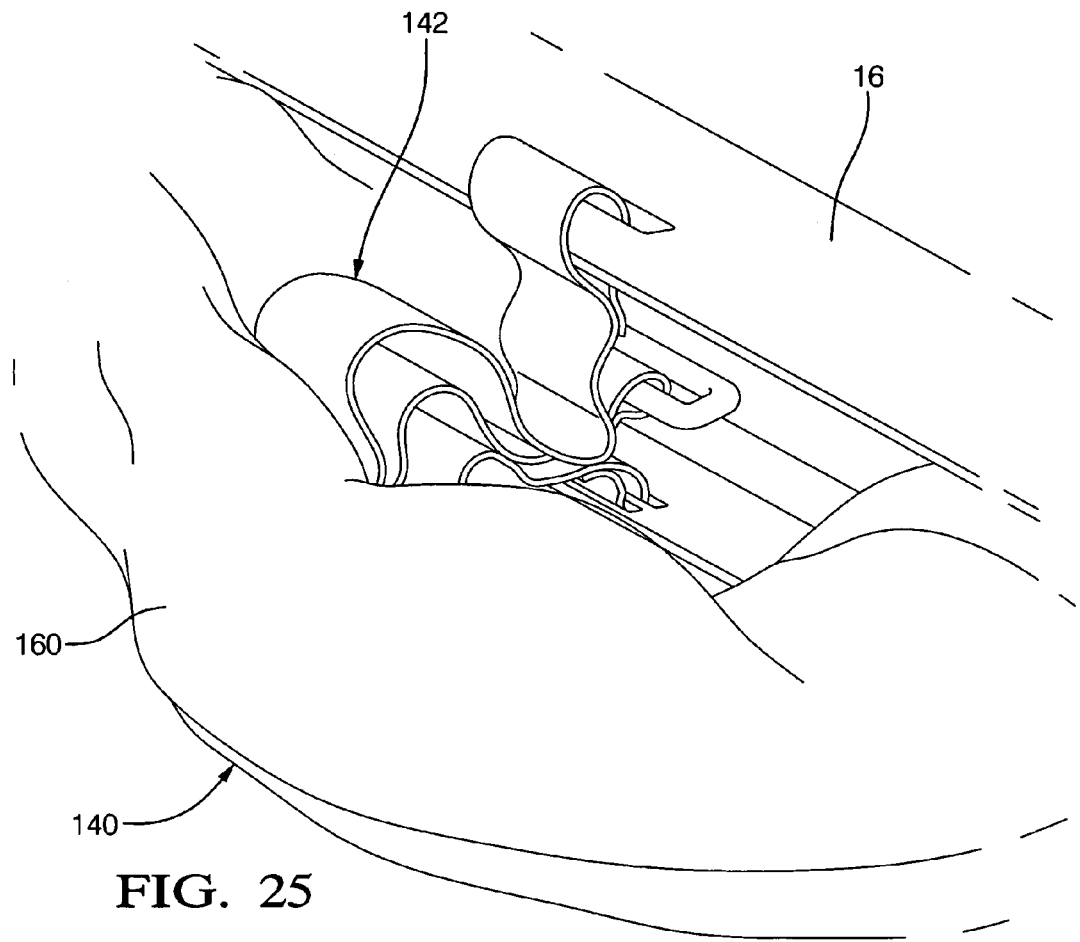
Figure 27:
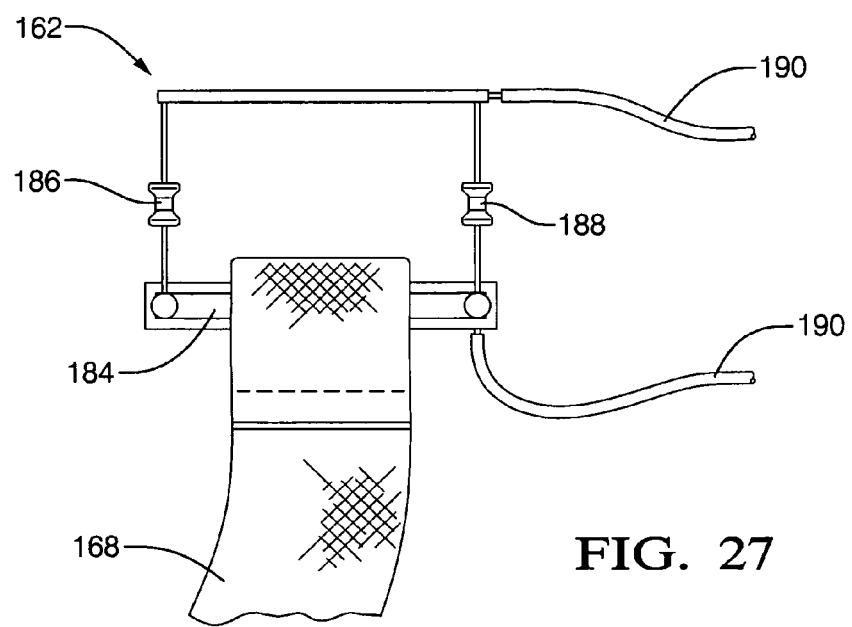
FIG. 27 illustrates portions of a sensing device contemplated for use in exemplary embodiments of the present invention.

Referring now to FIGS. 22-25, various configurations of obstructed deployment of deployable member 140 are illustrated. For example and referring now to FIG. 22, deployable member 140 is illustrated as being deflected upwardly away from the first direction. When this occurs lower tether 166 will become taught and center tether 168 as well as upper tether 164 will not be pulled to their full length. More particularly, center tether 168 will not provide a pulling force on sensing element 162. Accordingly, no signal will be provided to the second initiator of the inflator. This feature of no signal being generated by upward or downward positioning of deployable member 140 is provided by the three tether arrangement of sensing element 142 or more particularly the securement locations of the tethers about the sensing element. For example, and referring now to FIG. 19 downward deployment of deployable member 140 is illustrated by dashed lines of sensing device 142. Therefore, the lengths and securement locations of tethers 164, 166 and 168 of sensing device 142 provide a means for determining whether deployable member 140 has fully deployed in substantially the first direction indicated by arrow 148. If this deployment stage does not occur no signal will be sent to the inflator to cause the second stage of inflation to be produced. Referring now to FIGS. 24 and 25 other obstructed deployment of deployable member 140 is illustrated. Here forward portion 160 is deflected inwardly and accordingly the tethers of sensing device 142 are not completely unfurled and therefore no tension is applied to sensing element 162 by central tether 168. Again, this configuration illustrates an obstructed deployment of deployable member 140 which will prevent a signal to be sent to the inflator to cause the second stage of inflation.

Referring back now to FIG. 18 another aspect of an exemplary embodiment of the present invention is illustrated. As previously mentioned, mounting member 150 provides a means for securing a portion of deployable member 140 to the bottom wall 156 of the airbag module housing 16. This point of securement is illustrated by lines 172 in contrast to a line of securement 174, which would correspond to deployable member 140 being secured proximate to the opening of the housing 16. By locating the point of securement at bottom wall 156, deployable member 140 is provided with greater rigidity during deployment and is less susceptible to being deployed downwardly or upwardly in the directions of arrows 176 unless a deflecting or intervening force is applied to a portion of deployable member 140. It is this deflecting or intervening force that exemplary embodiments of the present invention are designed to detect and accordingly prevent a second stage of inflation from occurring if such movement is detected.

Figure 26:
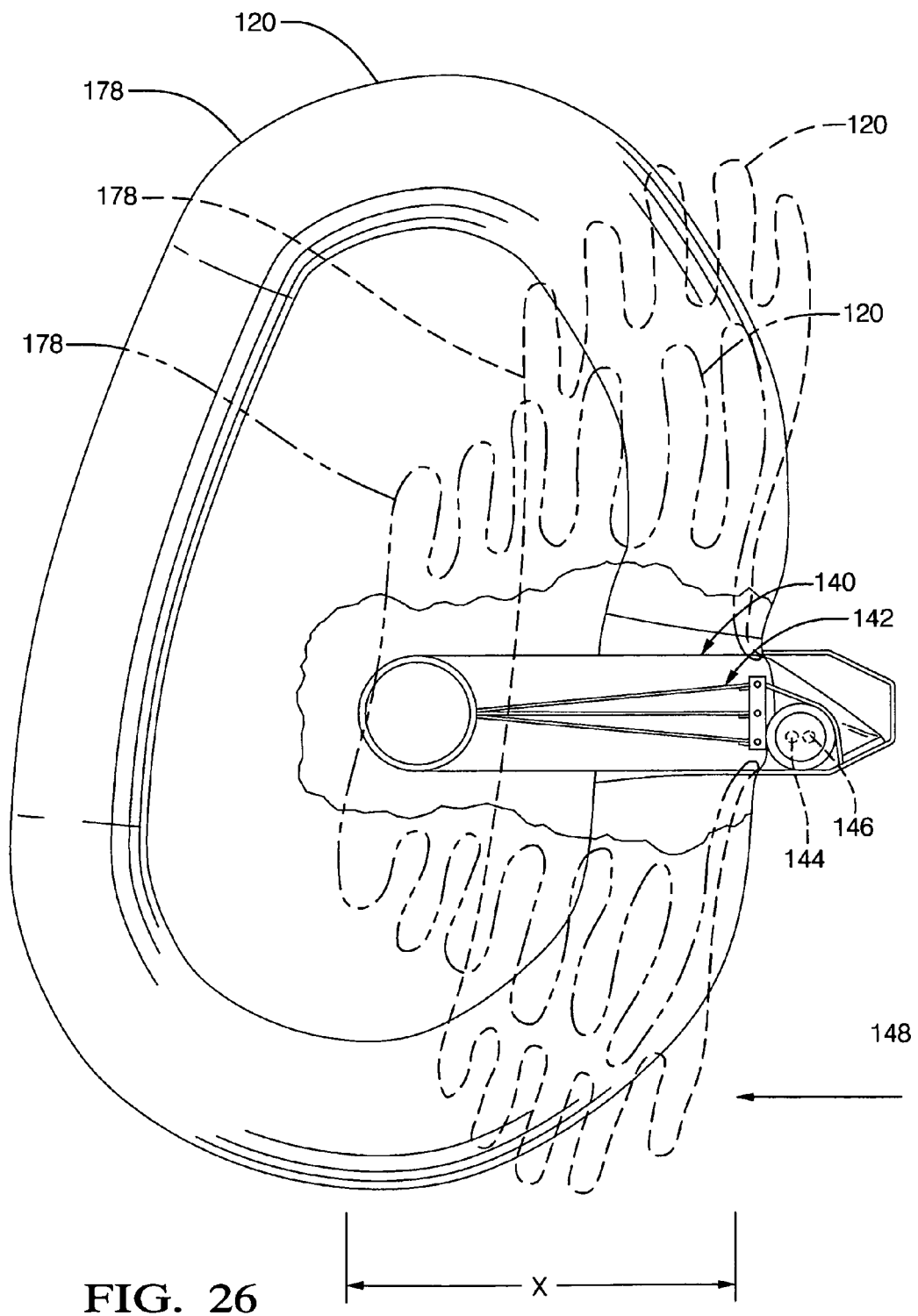
FIG. 26 is a cross-sectional view of deployment stages of an air bag device constructed in the FIG. 17 embodiment.

Referring now to FIG. 26, two stages of deployment of inflatable cushion 20 are illustrated. In the first stage, which corresponds to deployable member 140 being fully deployed and the first initiator of the inflator providing the first inflator output to deployable member 140 and inflatable cushion 20, a leading edge or forward portion 178 of inflatable cushion 20 is pushed further forward in the direction of arrow 148 as deployable member 140 or forward portion 160 causes forward portion 178 of the inflatable cushion to move outwardly. This displacement occurs faster than if no deployable member 140 was disposed within inflatable cushion 20 since deployable member 140 pushes the leading edge of the inflatable cushion out first. An example of such configuration is illustrated by the dashed lines of inflatable cushion 20 in FIG. 26. For purposes of explanation and illustrating the greater forward deployment of the forward portion 178 with deployable member 140, the dashed lines corresponding to forward portion 178 are intended to represent the location of forward portion 178 of inflatable cushion 20 without a deployable member 140 positioned within the inflatable cushion as opposed to the location of forward portion 178 with deployable member disposed therein. Each of these positions are intended to illustrate where forward portion 178 would be located at the same time period after initial initiation by the inflator. As illustrated, the inflatable cushion without the deployable member disposed therein will not reach as far in the "X" direction at the same time after initial inflation as opposed to the inflatable cushion with deployable member 140 disposed therein. Accordingly, deployable member 140 causes forward portion 178 to move further away from the housing during an initial period of inflation as well as providing a means for determining whether deployable member 140 has been obstructed. If the deployable member 140 is allowed to deploy to its full configuration, sensing element 162 provides a signal to the inflator causing the second initiator 146 to fire and thereby fully inflate inflatable cushion 20 to the fully inflated configuration illustrated in FIG. 26.

As illustrated and when inflatable cushion 20 reaches its full inflation configuration, forward portion 178 of inflatable cushion 20 is disposed in a spaced relationship with regard to forward portion 160 of deployable member 140.

In accordance with an exemplary embodiment of the present invention, deployable member 140 provides an inflatable proximity sensor that fully deployed as when a first stage of the inflator is activated. In accordance with an exemplary embodiment, this occurs approximately 5 ms after the initial activation of the inflator. At approximately 10 ms after the initial activation of the inflator, and if sensing element 162 provides the appropriate signal, the second stage is fired wherein full deployment of the inflatable cushion occurs. It is, of course, understood that the aforementioned time periods are provided as non-limiting examples and the present invention is intended to be used with time periods greater or less than the aforementioned values. In addition, it is also understood that the microprocessor of the sensing and diagnostic module may, in an alternative embodiment, have logic for determining and providing the time delays between the first and second stages of inflation, wherein such timing or time periods between the first stage and the second stage may vary the total outputs of the initiators and the inflator.

In addition, and referring back now to FIG. 18, deployable member 140 is also configured to have venting apertures 180, which will define fluid paths for inflation gases to flow through and ultimately inflate inflatable cushion 20. In one embodiment, the apertures maybe covered with deployable flap portions 82 that are configured to open by means of breakaway stitching when a certain pressure is reached within deployable member 140. Alternatively, venting apertures 180 maybe always open or a permeable material is positioned over apertures 180. The function of apertures 180 is to provide a fluid path for inflation of inflatable cushion 20. Thus, the usage of flaps or breakaway stitching or permeable members may ultimately depend upon the inflation output provided by the first initiator and the second initiator of the inflator as well as the configurations of deployable member 140 and inflatable cushion 20. In yet another alternative embodiment separate inflation paths may be provided for both the inflatable cushion and the deployable member disposed therein.

Referring to FIG. 17, an example of sensing element 162 is illustrated; here center tether 168 is secured to a conductive member 184. Conductive member 184 is configured to break or tear such that it no longer provides an electrical path between a first resistor 186 and a second resistor 188, which are connected in parallel by electrical connectors 190. Accordingly, when conductive member 184 provides an electrical path between first resistor 186 and second resistor 188 a known resistance is provided. However, when deployable member 140 reaches an unobstructed deployment configuration, a force is applied to conductive member 184 such that the conductive path between first resistor 186 and second resistor 188 is no longer available. Accordingly, the resistance encountered by electrical connectors 190 will be equal to that of second resistor 188. Therefore, control logic of the sensing and diagnostic module can be easily configured to determine whether conductive member 184 has been severed. For example, if each of the resistors has the same resistance, severing of conductive member 184 will cause the resistance to double. In addition, sensing and diagnostic module can easily determine whether the power has been cut or there is a short-circuit in the system. In each of these cases the control logic of the sensing and diagnostic module will be configured to provide an appropriate output signal. It is, of course, understood that the aforementioned illustration of sensing element 162 is provided as a non-limiting example and any other means for providing an output signal in response to a force received by central tether 168 is contemplated to be within the scope of the present invention.

Figure 28:
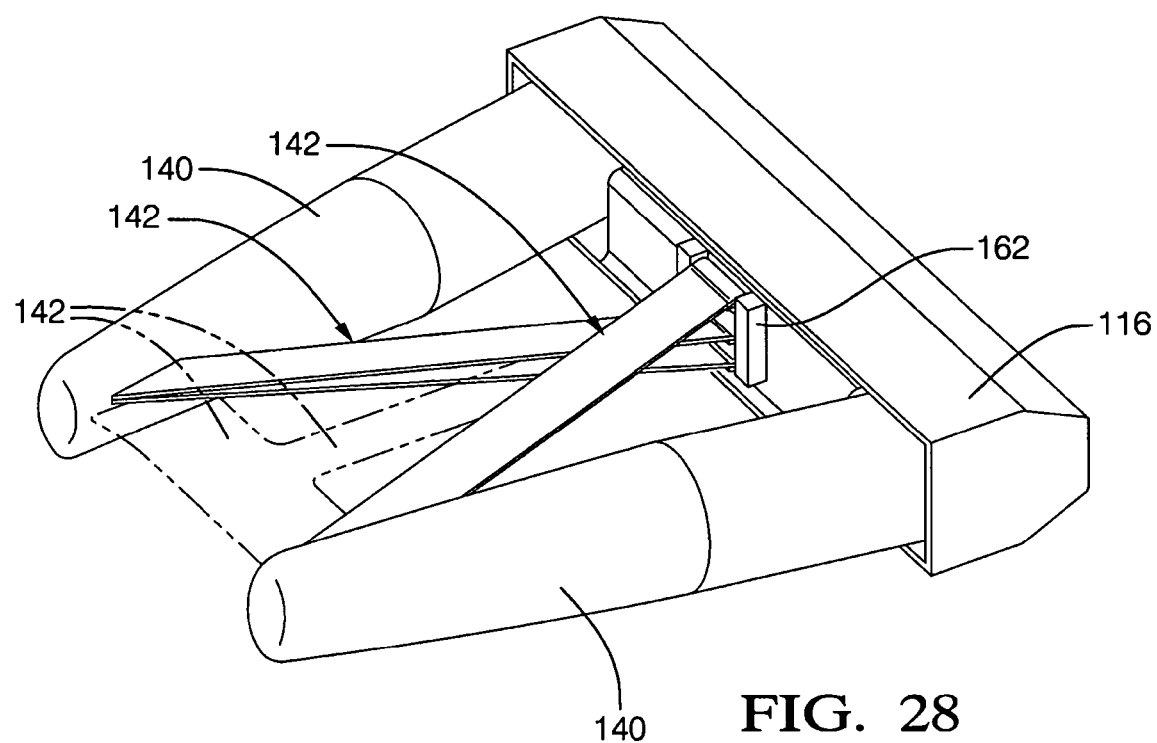
FIG. 28 is a perspective view of a deployable member for use in an airbag module in accordance with another alternative exemplary embodiment of the present invention.

Referring now to FIG. 28 an alternative exemplary embodiment of the present invention is illustrated here deployable member 140 is replaced by a pair of deployable arms 140 each having their own sensing device 142 wherein a plurality of tethers are positioned to provide force to a sensing element 162 upon unobstructed deployment of deployable members 140. In yet another alternative embodiment, and as illustrated by the dashed lines in FIG. 28, a non-inflatable member 192 is secured between the forward ends of deployable members 140 and a single sensing device 142 is secured between non-inflatable member 192 and sensing element 162, wherein signals or lack thereof are generated during deployment of deployable members 140, which corresponds to an initial stage of deployment of the inflatable cushion of the airbag device. In yet another alternative embodiment deployable member 140 (FIG. 18) comprises a non-inflatable portion 192 (illustrated by the dashed lines in FIG. 18), which separates deployable member 140 into two discrete chambers that are inflated at opposite ends of the inflator or inflator housing.

In yet another alternative embodiment, it is contemplated that sensing elements 162 will provide a signal to a venting device as opposed to the second initiator wherein a single stage inflator is used and a signal is provided to open a vent in the housing. In yet another alternative embodiment, the signal is provided to both a second initiator and a venting device to provide various means for modifying the inflator output of the airbag module.

Figure 29:
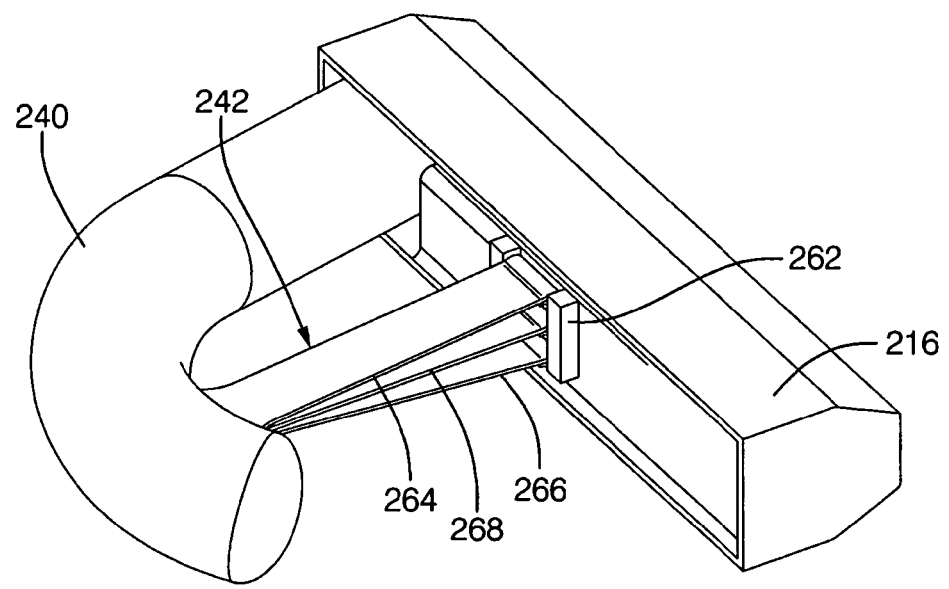
FIG. 29 is a perspective view of a deployable member for use in an airbag module in accordance with another alternative exemplary embodiment of the present invention.

In yet another alternative exemplary embodiment, and referring now to FIG. 29 here deployable member 140 is replaced by a deployable arm 240 having an arcuate or curved shape. In this embodiment the deployable arm has only one inflation opening and a sensing device 242 is secured to a forward sealed end of the deployable member. In yet another alternative embodiment a pair of deployable arms is contemplated each having their inflation openings disposed on either end of the housing 16 and each having their own sensing device wherein one of the curved deployable members sweeps outwardly in one direction during inflation and the other deployable member sweeps out in an opposite direction.

In accordance with an exemplary embodiment of the present invention, inflation energy or gas input to the cushion is controlled by a combination of an electronic sensing system (first sensing device 26) and a mechanical system or apparatus (second sensing device 28), which relies upon a combination of inputs to determine what type inflation output is to be provided. In accordance with an exemplary embodiment, an electronic sensing device provides one input (e.g., indicating a passenger position, size, weight and location with respect to the airbag module) and a mechanical or interactive sensing device that provides another input based upon interaction of the mechanical device with either the occupant or another item wherein the apparatus and method of exemplary embodiments of the present invention will provide an inflation output to the inflatable cushion based upon both of these inputs.

In addition to first sensing device 26 the sensing and diagnostic module 22 may also receive signals for a seat position sensor 39, a seat buckle sensor 21, a seat sensor 23 (e.g., weight) and a seat back sensor 25. Exemplary embodiments of the present invention provide a low cost method to change the level of inflation of a passenger side airbag based on an occupant's position relative to the deploying cushion (all the way from suppression to full deployment). This method combines a low cost fully electronic proximity sensor and a low cost electro-mechanical sensing or all mechanical sensing element to make a system for deploying a passenger airbag. The combination of the two devices provides additional reliability.

The electromechanical sensor works as an integral part of the deployment of the airbag module. The first stage of a dual stage inflator is deployed in accordance with a predetermined activation event and the sensing and diagnostic module receives signals from the first sensing device 26 and the response of the leading edge of the cushion is monitored to determine if an obstruction is present. If the leading edge of the cushion does not encounter resistance the second stage of the inflation is initiated and the cushion fully inflates. The first stage of the inflation needs to be low enough to meet all of the regulated test conditions near to the airbag module.

The mechanical sensor may include direct venting of the inflator gas which will enable a low level deployment of the airbag when the occupant is in close proximity. A mechanical sensing tether will be able to close the vent if necessary for a full deployment in the event of an in-position occupant.

Figure 30:
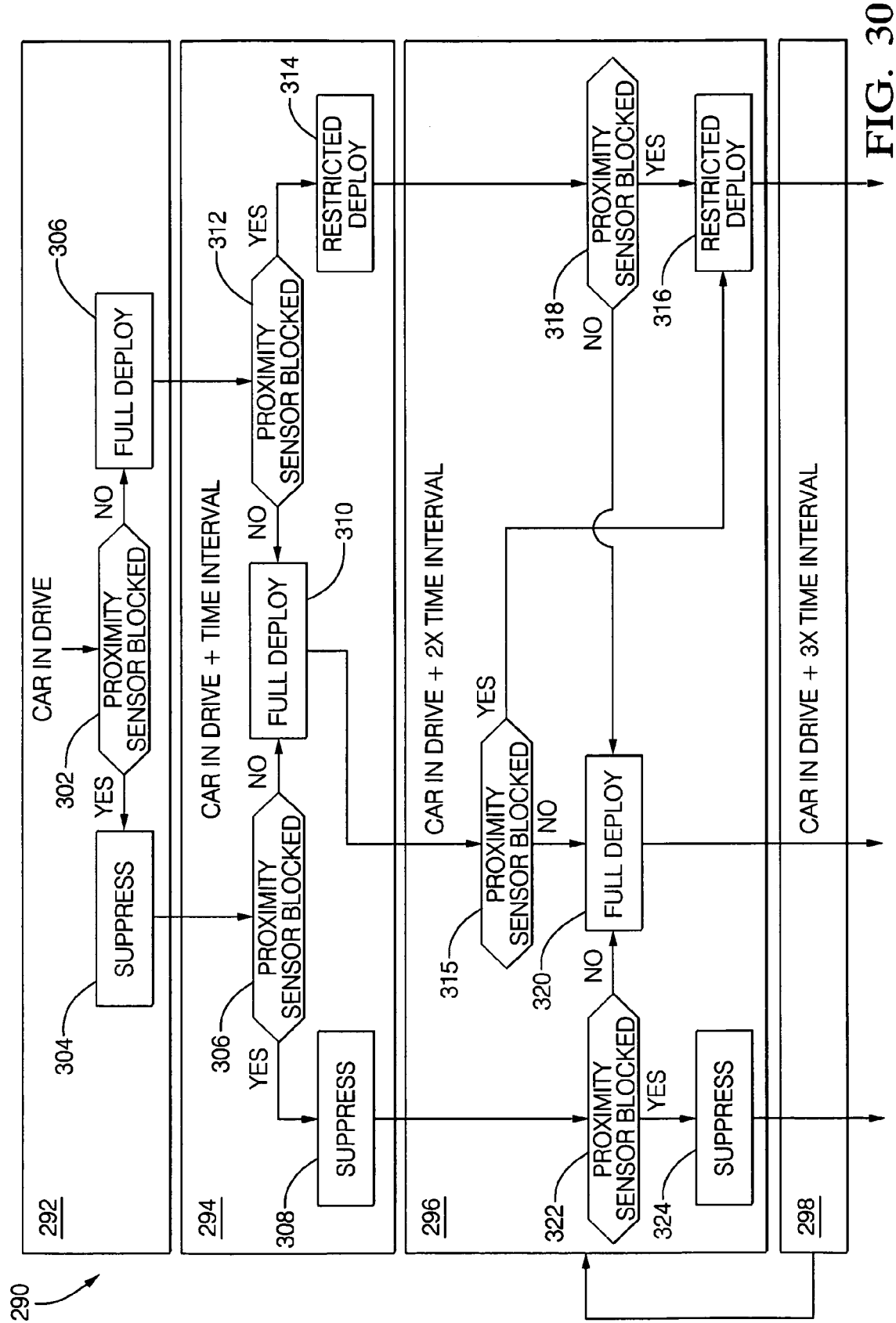
FIG. 30 illustrates portions of control logic for an airbag deployment system in accordance with an exemplary embodiment of the present invention.

Referring now to FIG. 30 an example of the control logic for the airbag deployment system of the present invention is illustrated. Here a portion of the control logic of a computer algorithm 290 of the sensing and diagnostic module is illustrated schematically. In an exemplary embodiment the sensing-and-diagnostic module comprises a microprocessor, microcontroller or other equivalent processing device capable of executing commands of computer readable data or program for executing a control algorithm that controls the operation of the airbag module. In order to perform the prescribed functions and desired processing, as well as the computations therefore (e.g., the execution of fourier analysis algorithm(s), the control processes prescribed herein, and the like), the controller may include, but not be limited to, a processor(s), computer(s), memory, storage, register(s), timing, interrupt(s), communication interfaces, and input/output signal interfaces, as well as combinations comprising at least one of the foregoing. For example, the controller may include input signal filtering to enable accurate sampling and conversion or acquisitions of such signals from communications interfaces. As described above, exemplary embodiments of the present invention can be implemented through computer-implemented processes and apparatuses for practicing those processes.

As illustrated in FIG. 30, the control logic is separated into four stages. A first stage 292 is run once a vehicle has been placed into drive or the vehicle engine has started and movement of the vehicle has been detected. A second stage 294 refers to a sequence of logic executed after a first predetermined time period after the first stage has been detected. A third stage 296 refers to a sequence of logic executed after a second predetermined time period after the first stage has been detected or alternatively two times the first time period. A fourth stage 298 refers to a sequence of logic executed after a third time period after the first stage has been detected or alternatively three times the first time period. After a fourth time period after the first stage has been detected or alternatively four times the first time period, the control logic of stage 296 is repeated until the vehicle has been put in park or the engine has been shut off and no movement of the vehicle has been detected. An internal clock of the microprocessor can be used to measure the time periods.

In accordance with an exemplary embodiment, and once the sensing and diagnostic module detects that the vehicle has been shifted to drive or the engine has been started and the vehicle is moving, the logic of the algorithm is run. At a first step 302 a decision node determines whether a signal is received from the first sensing device. If yes (e.g., the electronic sensor of the sensing device detects an object in area 30), a suppression signal is sent to the sensing and diagnostic module. This suppression signal is illustrated by box 304. If on the other hand and the first sensing device does not detect an object in area 30, a full deployment signal is sent to the sensing and diagnostic module. This signal is illustrated by box 306. If a deployment signal is received by the sensing and diagnostic module, the inflatable cushion will deploy and the second sensing device is used to vary the cushion deployment after initial deployment or inflation.

After a first prescribed period of time after the vehicle has been placed in drive the algorithm instructs or is configured to receive another signal from the first sensing device. If the suppression signal has been received a decision node 306 will determine whether the first sensing device has detected an object within area 30. If so, a suppression signal is again sent to the sensing and diagnostic module. This suppression signal is represented by box 308. If on the other hand, decision node 306 does not receive a signal corresponding to an object within area 30 a full deployment signal is sent to the sensing and diagnostic module. This full deployment signal is represented by box 310. Again, if a deployment signal is received by the sensing and diagnostic module the second sensing device will provide a means for tailoring the airbag deployment. If however, the sensing and diagnostic module already received a full deployment signal and the first time interval has expired the sensing device will again determine whether an object is within area 30. This step is represented by decision node 312. As illustrated, if an object is detected by the first sensing device a restricted deploy signal is sent to the sensing and diagnostic module. This restricted deployment signal is represented by box 314.

In accordance with an exemplary embodiment, the restricted deployment signal may consist of a signal to the sensing and diagnostic module which only authorizes the deployment of a first stage of a dual stage inflator, wherein further deployment of the inflatable cushion is controlled by the second sensing device (e.g., tether or inflatable cushion, etc.), which will provide a signal indicating whether the forward leading edge of the inflatable cushion has made contact with an object prior to the same extending a predetermined distance outwardly from the airbag module. In addition, the restricted deployment signal will cause a low output signal to be sent to the inflator of the airbag module unless other countermanding signals are received by the sensing and diagnostic module (e.g., a high crash severity signal from an accelerometer and other occupant detection signals such as a belted or unbelted seatbelt, the weight of the occupant in the passenger seat, etc.).

If on the other hand, decision node 312 receives a signal indicating that the first sensing device has not detected an object within area 30, the full deployment signal (box 310) is sent to the sensing and diagnostic module. Again, the second sensing device provides further tailoring of the inflatable cushion.

At stage 296, the first sensing device will again determine whether an object is within area 30 and provide an appropriate signal to the sensing and diagnostic module. For example, at a decision node 315, and if the first sensing device does not detect an object within area 30, a full deployment signal is again sent to the sensing and diagnostic module. This signal is represented by box 316. If on the other hand an object is detected within area 30, decision node 315 will send a restricted deployment signal to the sensing and diagnostic module. This restricted deployment signal is illustrated by box 316. If a restricted deployment signal has already been received by the sensing and diagnostic module, a decision node 318 will determine whether first sensing device 26 has detected an object within area 30. If an object is again detected within area 30, the restricted deployment signal of box 316 is again been sent to the sensing and diagnostic module. If on the other hand no object is detected, a full deployment signal is sent to the sensing and diagnostic module. This full deployment signal is illustrated by box 320.

If a suppression signal has already been received by the sensing and diagnostic module, the first sensing device will again determine whether or not an object is within area 30 and a decision node 322 will determine whether or not to send the suppression signal to the sensing and diagnostic module. If an object is again detected by the first sensing device, the suppression signal is then again sent to the sensing and diagnostic module. This signal is represented by box 324. Once the fourth stage 298 has been reached (represented by the arrows from boxes 316, 320 and 324), the algorithm will continue to cycle from fourth stage 298 back to third stage 296 until the sensing and diagnostic module receives a signal indicating that the vehicle has been placed in park and the engine has been shut off and no movement of the vehicle has been detected.

As discussed above, the suppression signal is sent when it has been determined that there is an object within area 30, presumably a rear facing infant seat. The restricted deployment signal is sent when the first sensing device has detected a transient object in area 30. For example, since the first stage determines whether an object has been detected prior to the vehicle being placed in drive or the engine is started and the vehicle is moving and if no object is detected at that first stage the logic will presume that further object detection within area 30 is transient or corresponds to movement of the occupant within the passenger compartment.

It should also be noted that the terms "first", "second", and "third", and the like may be used herein to modify elements performing similar and/or analogous functions. These modifiers do not imply a spatial, sequential, or hierarchical order to the modified elements unless specifically stated.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An air bag module, comprising:
    a housing having at least one vent opening;
    an inflatable cushion being stored in an un-deployed position in the housing;
    an inflator for inflating the inflatable cushion, the inflator being in fluid communication with the inflatable cushion and having a plurality of inflation openings for allowing an inflation gas to pass therethrough, at least one of the plurality of inflation openings being in fluid communication with the at least one vent opening;
    a system for controlling an inflation output of the inflator, the system comprising: a first sensing device, the first sensing device being an electronic sensing device configured to detect the presence of an object proximate to the air bag module, when the inflatable cushion is in an un-inflated state, the first sensing device providing a suppression signal when an object is detected within an area proximate to the air bag module;
    a second sensing device, the second sensing device being a mechanical sensing device configured to detect whether a leading edge of the inflatable cushion has made contact with an object prior to the leading edge reaching a predetermined distance from the air bag module during inflation of the inflatable cushion, the second sensing device being disposed within the inflatable cushion and is configured to cause the inflation output provided to the inflatable cushion to be varied when the leading edge of the inflatable cushion has made contact with an object prior to the leading edge reaching the predetermined distance from the air bag module, the mechanical sensing device comprising a tether having a vent opening disposed within a portion of the tether, the vent opening aligning with the at least one vent opening in the housing when the leading edge of the inflatable cushion has made contact with the object prior to the leading edge reaching the predetermined distance from the air bag module during inflation of the inflatable cushion; and
    a sensing and diagnostic module for receiving the suppression signal and an activation signal, wherein the activation signal corresponds to an event that requires inflation of inflatable cushion in absence of the suppression signal and the sensing and diagnostic module is configured to determine whether the inflation output is to be provided to the inflatable cushion.

2. The airbag module as in claim 1, wherein the tether is secured to an interior surface of the inflatable cushion proximate to the leading edge of the inflatable cushion at one end and a portion of the airbag module at the other end, wherein the vent opening disposed in the tether is configured to allow venting through the at least one vent opening in the housing when the inflatable cushion is in the un-deployed position and the at least one vent opening is covered by the deployable member when the leading edge of the inflatable cushion reaches the predetermined distance without contacting the object.

3. The airbag module as in claim 2, wherein the inflator provides a first inflation output to the inflatable cushion when the tether is not fully extended and a second inflation output to the inflatable cushion when the tether is fully extended, the second inflation output being greater than the first inflation output and at least one of the plurality of inflation openings of the inflator aligning with the at least one vent opening in the housing.

4. The airbag module as in claim 2, wherein the tether blocks the at least one vent opening during an initial phase of deployment of the inflatable cushion and thereafter the at least one vent opening is aligned with the opening in the tether until the inflatable cushion reaches a full deployment configuration.

5. The airbag module as in claim 4, wherein the tether comprises a plurality of vent openings for aligning with the at least one vent opening and the at least one inflation opening of the inflator aligned with the at least one vent opening in the housing.

6. The airbag module as in claim 1, wherein the tether further comprises break away stitching that must be torn prior to the leading edge of the inflatable cushion reaching the predetermined distance.

7. The airbag module as in claim 1, wherein the tether causes a sensor to provide a signal when the tether is pulled taught when the leading edge of the inflatable cushion reaches the predetermined distance.

8. The airbag module as in claim 1, wherein the tether is folded within the housing when the inflatable cushion is in an un-inflated state.

9. The airbag module as in claim 1, wherein the length of the tether corresponds to the predetermined distance the leading edge of the inflatable travels away from the airbag module.

* * * * *